(12) United States Patent
Credelle et al.

(10) Patent No.: US 7,492,379 B2
(45) Date of Patent: Feb. 17, 2009

(54) COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE

(75) Inventors: Thomas Lloyd Credelle, Morgan Hill, CA (US); Candice Hellen Brown Elliott, Vallejo, CA (US); Michael Francis Higgins, Cazadaro, CA (US)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 308 days.

(21) Appl. No.: 10/278,353

(22) Filed: Oct. 22, 2002

(65) Prior Publication Data

US 2003/0128225 A1 Jul. 10, 2003

Related U.S. Application Data

(63) Continuation-in-part of application No. 10/243,094, filed on Sep. 13, 2002, now abandoned.

(60) Provisional application No. 60/346,738, filed on Jan. 7, 2002.

(51) Int. Cl.
G09G 3/28 (2006.01)
G09G 3/32 (2006.01)
G09G 3/36 (2006.01)
G09G 5/00 (2006.01)
G06F 3/038 (2006.01)
G02F 1/1335 (2006.01)

(52) U.S. Cl. ............ 345/695; 345/72; 345/83; 345/88; 345/204; 349/106; 349/107; 349/108; 349/109

(58) Field of Classification Search .............. 345/72, 345/83, 88, 92, 204–205, 209, 96, 690, 694–696; 349/106–109
See application file for complete search history.

(56) References Cited

U.S. PATENT DOCUMENTS

| 3,971,065 A | 7/1976 | Bayer |
| 4,353,062 A | 10/1982 | Lorteije et al. |
| 4,593,978 A | 6/1986 | Mourey et al. |

(Continued)

FOREIGN PATENT DOCUMENTS

DE 197 46 329 A1 3/1999

(Continued)

OTHER PUBLICATIONS

Bechtel et al., U.S. Patent Application Publication, Pub. No. US 2002/0190648 A1, Publication Date: Dec. 19, 2002.

(Continued)

*Primary Examiner*—Sumati Lefkowitz
*Assistant Examiner*—Alexander S. Beck
(74) *Attorney, Agent, or Firm*—MacPherson Kwok Chen & Heid LLP

(57) ABSTRACT

Various embodiments of a sub-pixel octal grouping are disclosed. The octal grouping may comprise three-color sub-pixels with one colored sub-pixel comprising twice the number of positions within the octal sub-pixel grouping as the other two colored sub-pixels. Various embodiments for performing sub-pixel rendering on the sub-pixel groupings are disclosed.

37 Claims, 26 Drawing Sheets

U.S. PATENT DOCUMENTS

| | | | |
|---|---|---|---|
| 4,632,514 A | 12/1986 | Ogawa et al. | |
| 4,642,619 A | 2/1987 | Togashi | |
| 4,651,148 A | 3/1987 | Takeda et al. | |
| 4,725,828 A * | 2/1988 | Cowlishaw | 345/694 |
| 4,751,535 A | 6/1988 | Myers | |
| 4,773,737 A | 9/1988 | Yokono et al. | |
| 4,786,964 A | 11/1988 | Plummer et al. | |
| 4,792,728 A | 12/1988 | Chang et al. | |
| 4,800,375 A | 1/1989 | Silverstein et al. | |
| 4,822,142 A | 4/1989 | Yasui | |
| 4,853,592 A | 8/1989 | Strathman | |
| 4,874,986 A | 10/1989 | Menn et al. | |
| 4,886,343 A | 12/1989 | Johnson | |
| 4,908,609 A | 3/1990 | Stroomer | |
| 4,920,409 A | 4/1990 | Yamagishi | |
| 4,946,259 A | 8/1990 | Matino et al. | |
| 4,965,565 A | 10/1990 | Noguchi | |
| 4,966,441 A | 10/1990 | Conner | |
| 4,967,264 A | 10/1990 | Parulski et al. | |
| 5,006,840 A | 4/1991 | Hamada et al. | |
| 5,052,785 A | 10/1991 | Takimoto et al. | |
| 5,113,274 A | 5/1992 | Takahashi et al. | |
| 5,132,674 A | 7/1992 | Bottorf | |
| 5,144,288 A | 9/1992 | Hamada et al. | |
| 5,196,924 A | 3/1993 | Lumelsky et al. | |
| 5,233,385 A | 8/1993 | Sampsell | |
| 5,311,205 A | 5/1994 | Hamada et al. | |
| 5,311,337 A | 5/1994 | McCartney, Jr. | |
| 5,315,418 A | 5/1994 | Sprague et al. | |
| 5,334,996 A | 8/1994 | Tanigaki et al. | |
| 5,339,092 A | 8/1994 | Johnson et al. | |
| 5,341,153 A | 8/1994 | Benzschawel et al. | |
| 5,398,066 A | 3/1995 | Martinez-Uriegas et al. | |
| 5,436,747 A | 7/1995 | Suzuki | |
| 5,450,216 A | 9/1995 | Kasson | |
| 5,461,503 A | 10/1995 | Deffontaines et al. | |
| 5,477,240 A | 12/1995 | Huebner et al. | |
| 5,485,293 A * | 1/1996 | Robinder | 345/88 |
| 5,535,028 A | 7/1996 | Bae et al. | |
| 5,541,653 A | 7/1996 | Peters et al. | |
| 5,561,460 A | 10/1996 | Katoh et al. | |
| 5,563,621 A | 10/1996 | Silsby | |
| 5,579,027 A | 11/1996 | Sakurai et al. | |
| 5,648,793 A | 7/1997 | Chen | |
| 5,754,226 A | 5/1998 | Yamada et al. | |
| 5,773,927 A | 6/1998 | Zimlich | |
| 5,792,579 A | 8/1998 | Phillips | |
| 5,815,101 A | 9/1998 | Fonte | |
| 5,821,913 A | 10/1998 | Mamiya | |
| 5,899,550 A | 5/1999 | Masaki | |
| 5,917,556 A | 6/1999 | Katayama | |
| 5,949,496 A | 9/1999 | Kim | |
| 5,973,664 A | 10/1999 | Badger | |
| 5,991,438 A | 11/1999 | Shaked et al. | |
| 6,002,385 A * | 12/1999 | Silverbrook | 345/100 |
| 6,002,446 A | 12/1999 | Eglit | |
| 6,005,582 A | 12/1999 | Gabriel et al. | |
| 6,008,868 A | 12/1999 | Silverbrook | |
| 6,023,315 A | 2/2000 | Harrold et al. | |
| 6,034,666 A | 3/2000 | Kanai et al. | |
| 6,038,031 A | 3/2000 | Murphy | |
| 6,049,626 A | 4/2000 | Kim | |
| 6,061,533 A | 5/2000 | Kajiwara | |
| 6,064,363 A | 5/2000 | Kwon | |
| 6,069,670 A | 5/2000 | Borer | |
| 6,072,272 A | 6/2000 | Rumbaugh | |
| 6,072,445 A | 6/2000 | Spitzer et al. | |
| 6,075,905 A | 6/2000 | Herman et al. | |
| 6,097,367 A | 8/2000 | Kuriwaki et al. | |
| 6,108,122 A | 8/2000 | Ulrich et al. | |
| 6,137,560 A | 10/2000 | Utsumi et al. | |
| 6,144,352 A | 11/2000 | Matsuda et al. | |
| 6,160,535 A | 12/2000 | Park | |
| 6,184,903 B1 | 2/2001 | Omori | |
| 6,188,385 B1 | 2/2001 | Hill et al. | |
| 6,198,507 B1 | 3/2001 | Ishigami | |
| 6,219,025 B1 | 4/2001 | Hill et al. | |
| 6,225,967 B1 | 5/2001 | Hebiguchi | |
| 6,225,973 B1 | 5/2001 | Hill et al. | |
| 6,236,390 B1 | 5/2001 | Hitchcock | |
| 6,239,783 B1 | 5/2001 | Hill et al. | |
| 6,243,055 B1 | 6/2001 | Fergason | |
| 6,243,070 B1 | 6/2001 | Hill et al. | |
| 6,271,891 B1 | 8/2001 | Ogawa et al. | |
| 6,299,329 B1 | 10/2001 | Mui et al. | |
| 6,326,981 B1 | 12/2001 | Mori et al. | |
| 6,327,008 B1 | 12/2001 | Fujiyoshi | |
| 6,340,994 B1 | 1/2002 | Margulis et al. | |
| 6,348,929 B1 | 2/2002 | Acharya et al. | |
| 6,356,278 B1 | 3/2002 | Stamm et al. | |
| 6,360,023 B1 | 3/2002 | Betrisey et al. | |
| 6,377,262 B1 | 4/2002 | Hitchcock et al. | |
| 6,385,466 B1 | 5/2002 | Hirai et al. | |
| 6,392,717 B1 | 5/2002 | Kunzman | |
| 6,393,145 B2 | 5/2002 | Betrisey et al. | |
| 6,396,505 B1 * | 5/2002 | Lui et al. | 345/613 |
| 6,441,867 B1 | 8/2002 | Daly | |
| 6,453,067 B1 | 9/2002 | Morgan et al. | |
| 6,466,618 B1 | 10/2002 | Messing et al. | |
| 6,469,766 B2 | 10/2002 | Waterman et al. | |
| 6,486,923 B1 | 11/2002 | Maeshima et al. | |
| 6,545,653 B1 | 4/2003 | Takahara et al. | |
| 6,545,740 B2 | 4/2003 | Werner | |
| 6,583,787 B1 | 6/2003 | Pfister et al. | |
| 6,593,981 B1 | 7/2003 | Haim et al. | |
| 6,600,495 B1 | 7/2003 | Boland et al. | |
| 6,614,414 B2 | 9/2003 | De Haan et al. | |
| 6,661,429 B1 | 12/2003 | Phan | |
| 6,674,430 B1 | 1/2004 | Kaufman et al. | |
| 6,674,436 B1 | 1/2004 | Dresevic et al. | |
| 6,680,761 B1 | 1/2004 | Greene et al. | |
| 6,681,053 B1 | 1/2004 | Zhu | |
| 6,714,206 B1 | 3/2004 | Martin et al. | |
| 6,738,526 B1 | 5/2004 | Betrisey et al. | |
| 6,750,875 B1 | 6/2004 | Keely, Jr. et al. | |
| 6,781,626 B1 | 8/2004 | Wang | |
| 6,801,220 B2 | 10/2004 | Greier et al. | |
| 6,804,407 B2 | 10/2004 | Weldy | |
| 6,833,890 B2 | 12/2004 | Hong et al. | |
| 6,836,300 B2 | 12/2004 | Choo et al. | |
| 6,842,207 B2 | 1/2005 | Nishida et al. | |
| 6,850,294 B2 | 2/2005 | Roh et al. | |
| 6,856,704 B1 | 2/2005 | Gallagher et al. | |
| 6,867,549 B2 | 3/2005 | Cok et al. | |
| 6,885,380 B1 | 4/2005 | Primerano et al. | |
| 6,888,604 B2 | 5/2005 | Rho et al. | |
| 6,897,876 B2 | 5/2005 | Murdoch et al. | |
| 6,903,754 B2 | 6/2005 | Brown Elliott | |
| 6,928,196 B2 | 8/2005 | Bradley et al. | |
| 6,930,676 B2 * | 8/2005 | De Haan et al. | 345/204 |
| 6,937,217 B2 | 8/2005 | Klompenhouwer et al. | |
| 6,950,156 B1 | 9/2005 | Yoshida | |
| 6,989,876 B2 | 1/2006 | Song et al. | |
| 7,110,012 B2 | 9/2006 | Messing et al. | |
| 7,123,277 B2 * | 10/2006 | Brown Elliott et al. | 345/690 |
| 7,129,955 B2 | 10/2006 | Motomura | |
| 7,167,186 B2 | 1/2007 | Credelle et al. | |
| 7,167,275 B2 | 1/2007 | Kukasawa | |
| 7,184,066 B2 | 2/2007 | Elliot et al. | |
| 7,221,381 B2 | 5/2007 | Brown Elliott et al. | |
| 2001/0048764 A1 | 12/2001 | Betrisey et al. | |
| 2002/0015110 A1 | 2/2002 | Brown Elliott | |
| 2002/0030780 A1 | 3/2002 | Nishida et al. | |
| 2002/0054263 A1 | 5/2002 | Kim et al. | |

| | | |
|---|---|---|
| 2002/0093476 A1 | 7/2002 | Hill et al. |
| 2002/0118019 A1 | 8/2002 | Nomura |
| 2002/0149598 A1 | 10/2002 | Greier et al. |
| 2002/0186229 A1 | 12/2002 | Brown Elliott |
| 2003/0034992 A1 | 2/2003 | Brown Elliott et al. |
| 2003/0071775 A1 | 4/2003 | Ohashi et al. |
| 2003/0072374 A1 | 4/2003 | Sohm |
| 2003/0077000 A1 | 4/2003 | Blinn et al. |
| 2003/0085906 A1 | 5/2003 | Elliott et al. |
| 2003/0090581 A1 | 5/2003 | Credelle et al. |
| 2003/0103058 A1 | 6/2003 | Elliott et al. |
| 2003/0117423 A1 | 6/2003 | Brown Elliott |
| 2003/0128179 A1 | 7/2003 | Credelle |
| 2003/0128225 A1 | 7/2003 | Credelle et al. |
| 2003/0184571 A1 | 10/2003 | Hirayama |
| 2003/0218614 A1 | 11/2003 | Lavelle et al. |
| 2003/0218618 A1 | 11/2003 | Phan |
| 2004/0021804 A1 | 2/2004 | Hong et al. |
| 2004/0051724 A1 | 3/2004 | Elliott et al. |
| 2004/0061710 A1 | 4/2004 | Messing et al. |
| 2004/0075764 A1 | 4/2004 | Law et al. |
| 2004/0080479 A1 | 4/2004 | Credelle |
| 2004/0085495 A1 | 5/2004 | Roh et al. |
| 2004/0095521 A1 | 5/2004 | Song et al. |
| 2004/0108818 A1 | 6/2004 | Cok et al. |
| 2004/0114046 A1 | 6/2004 | Lee et al. |
| 2004/0150651 A1 | 8/2004 | Phan |
| 2004/0155895 A1 | 8/2004 | Lai |
| 2004/0169807 A1 | 9/2004 | Rho et al. |
| 2004/0174380 A1 | 9/2004 | Credelle et al. |
| 2004/0174389 A1 | 9/2004 | Ben-David et al. |
| 2004/0179160 A1 | 9/2004 | Rhee et al. |
| 2004/0189643 A1 | 9/2004 | Frisken et al. |
| 2004/0196297 A1 | 10/2004 | Elliott et al. |
| 2004/0213449 A1 | 10/2004 | Safee-Rad et al. |
| 2004/0239813 A1 | 12/2004 | Klompenhouwer |
| 2004/0239837 A1 | 12/2004 | Hong et al. |
| 2004/0247070 A1 | 12/2004 | Ali et al. |
| 2004/0263528 A1 | 12/2004 | Murdoch et al. |
| 2005/0001856 A1 | 1/2005 | Sparre et al. |
| 2005/0007327 A1 | 1/2005 | Elion et al. |
| 2005/0024380 A1 | 2/2005 | Lin et al. |
| 2005/0068477 A1 | 3/2005 | Shin et al. |
| 2005/0083356 A1 | 4/2005 | Roh et al. |
| 2005/0094871 A1 | 5/2005 | Berns et al. |
| 2005/0099426 A1 | 5/2005 | Primerano et al. |
| 2005/0140634 A1 | 6/2005 | Takatori |
| 2005/0151752 A1 | 7/2005 | Phan |
| 2005/0162600 A1 | 7/2005 | Rho et al. |
| 2005/0169551 A1 | 8/2005 | Messing et al. |

FOREIGN PATENT DOCUMENTS

| | | |
|---|---|---|
| DE | 199 23 527 | * 11/2000 |
| DE | 199 23 527 A1 | 11/2000 |
| DE | 201 09 354 U1 | 9/2001 |
| EP | 0 158 366 A2 | 10/1985 |
| EP | 0 203 005 A1 | 11/1986 |
| EP | 0 322 106 A2 | 6/1989 |
| EP | 0 361 981 A2 | 4/1990 |
| EP | 0 453 033 A2 | 10/1991 |
| EP | 0 0671 650 | 9/1995 |
| EP | 0 793 214 A1 | 2/1996 |
| EP | 0 812 114 A1 | 12/1997 |
| EP | 0 878 969 | 11/1998 |
| EP | 1 083 539 A2 | 3/2001 |
| EP | 1 261 014 A2 | 11/2002 |
| EP | 1 308 923 A1 | 5/2003 |
| GB | 2 133 912 A | 8/1984 |
| GB | 2 146 478 A | 4/1985 |
| GB | 2 282 928 A | 4/1995 |
| JP | 60-107022 | 6/1985 |
| JP | 62 127716 | 6/1987 |
| JP | 02-000826 | * 1/1990 |
| JP | 02-000826 A | 1/1990 |
| JP | 03-78390 | 4/1991 |
| JP | 03-036239 B | 5/1991 |
| JP | 06-102503 | 4/1994 |
| JP | 06-214250 | 8/1994 |
| JP | 11-014978 | 1/1999 |
| JP | 02-983027 B2 | 11/1999 |
| JP | 2004-004822 | 1/2004 |
| JP | 2004 078218 | 3/2004 |
| WO | WO 00/21067 | 4/2000 |
| WO | WO 00/42564 | 7/2000 |
| WO | WO 00/42762 | 7/2000 |
| WO | WO 00/45365 | 8/2000 |
| WO | WO 00/67196 | 11/2000 |
| WO | WO 00/70392 | 11/2000 |
| WO | WO 01/10112 A2 | 2/2001 |
| WO | WO 01/29817 A1 | 4/2001 |
| WO | WO 01/52546 A2 | 7/2001 |
| WO | WO 02/11112 A2 | 2/2002 |
| WO | WO 02/059685 A2 | 8/2002 |
| WO | WO 03/014819 A1 | 2/2003 |
| WO | WO 03/050605 A1 | 2/2003 |
| WO | WO 03/034380 A2 | 4/2003 |
| WO | WO 03/056383 A1 | 7/2003 |
| WO | WO 2004/017129 A1 | 2/2004 |
| WO | WO 2004/021323 A2 | 3/2004 |
| WO | WO 2004/027503 A1 | 4/2004 |
| WO | WO 2004/086128 A1 | 10/2004 |
| WO | WO 2005/050296 A1 | 6/2005 |
| WO | WO 2005/057532 A2 | 6/2005 |

OTHER PUBLICATIONS

Booth, Jr., Lawrence A., "Method and Apparatus for Wide Gamut Multicolor Display," U.S. Patent Application Publication, Publication No. US 2003/0011613 A1, Jan. 16, 2003.

"ClearType magnified," *Wired Magazine*, Nov. 8, 1999, Microsoft Typography, article posted Nov. 8, 1999, and last updated Jan. 27, 1999, © 1999 Microsoft Corporation, 1 page.

Credelle, Thomas L. et al., "P-00: MTF of High-Resolution PenTile Matrix™ Displays," *Eurodisplay 02 Digest*, 2002, pp. 1-4.

Daly, Scott, "Analysis of Subtriad Addressing Algorithms by Visual System Models," *SID Symp. Digest*, Jun. 2001, pp. 1200-1203.

Elliott, Candice H. Brown et al., "Color Subpixel Rendering Projectors and Flat Panel Displays," New Initiatives in Motion Imaging, SMPTE Advanced Motion Imaging Conference, Feb. 27-Mar. 1, 2003, Seattle, Washington, pp. 1-4.

Elliott, Candice H. Brown et al., "Co-optimization of Color AMLCD Subpixel Architecture and Rendering Algorithms," *SID Symp. Digest*, May 2002, pp. 172-175.

Feigenblatt, R.I., "Full-color imaging on amplitude-quantized color mosaic displays," *SPIE*, vol. 1075, Digital Image Processing Applications, 1989, pp. 199-204.

Hayashi, Kenkichi, "Image Signal Processing Device for Minimizing False Signals at Color Boundaries,"U.S. Patent Application Publication, Publication No. US 2002/0140831 A1, Oct. 3, 2002.

Hoelen, Christoph Gerard August et al., "Light Panel with Enlarged Viewing Window," U.S. Patent Application Publication, Publication No. US 2003/0043567 A1, Mar. 6, 2003.

Johnston, Stuart J., "An Easy Read: Microsoft's ClearType," *InformationWeek Online*, Redmond, WA, Nov. 12, 1998, 3 pages.

Johnston, Stuart J., "Clarifying ClearType," *InformationWeek Online*, Redmond, WA, Jan. 4, 1999, 4 pages.

"Just Outta Beta," *Wired Magazine*, Dec. 1999, Issue 7.12, 3 pages.

Klompenhouwer, Michiel A. et al., "Subpixel Image Scaling for Color Matrix Displays," *SID Symp. Digest*, May 2002, pp. 176-179.

Kusunoki, Toshiaki et al., "Display Device Using Thin Film Cathode and Its Process," U.S. Patent Application Publication, Publication No. US 2001/0017515 A1, Aug. 30, 2001.

Markoff, John, "Microsoft's Cleartype Sets Off Debate on Originality," *The New York Times*, Dec. 7, 1998, 5 pages.

"Microsoft ClearType," http://www.microsoft.com/opentype/cleartype, Sep. 26, 2002, 4 pages.

Platt, John C., "Optimal Filtering for Patterned Displays," Microsoft Research, *IEEE Signal Processing Letters*, 2000, 4 pages.

Platt, John, "Technical Overview of ClearType Filtering," Microsoft Research, http://research.microsoft.com/users/jplatt/cleartype/default.aspx, Sep. 17, 2002, 3 pages.

Poor, Alfred, "LCDs: The 800-pound Gorilla," *Information Display*, Sep. 2002, pp. 18-21.

"Ron Feigenblatt's remarks on Microsoft ClearType™," http://www.geocities.com/SiliconValley/Ridge/6664/ClearType.html, Dec. 5, 1998, Dec. 7, 1998, Dec. 12, 1999, Dec. 26, 1999, Dec. 30, 1999, and Jun. 19, 2000, 30 pages.

"Sub-Pixel Font Rendering Technology," © 2003 Gibson Research Corporation, Laguna Hills, CA, 2 pages.

Werner, Ken, "OLEDs, OLEDs, Everywhere . . . ," *Information Display*, Sep. 2002, pp. 12-15.

Yamazaki, Shunpei, "Semiconductor Device and Manufacturing Method Thereof," U.S. Patent Application Publication, Publication No. US 2001/0040645 A1, Nov. 15, 2001.

Yamazaki, Shunpei et al., "Electro-Optical Device," U.S. Patent Application Publication, Publication No. US 2002/0017645 A1, Feb. 14, 2002.

Choo, Kyo Seop et al., "Data Wire Device of Pentile Matrix Display Device," U.S. Patent Application Publication, Pub. No. 2003/0071943 A1, Apr. 17, 2003.

Goertzen, Kenbe D., "System and Method for Optimizing Image Resolution Using Pixelated Imaging Device," U.S. Patent Application Publication, Pub. No. 2003/0071826 A1, Apr. 17, 2003.

Kunzman, Adam J., "Reduced Color Separation White Enhancement for Sequential Color Displays," U.S. Patent Application Publication, Pub. No. 2002/0122160 A1, Sep. 5, 2002.

Lee, Baek-woon et al., "40.5L: Late-News Paper: TFT-LCD with RGBW Color System," *SID 03 Digest*, 2003, pp. 1212-1215.

Sun, Xiuhong, "Multispectral Imaging System with Spatial Resolution Enhancement," U.S. Patent Application Publication, Pub. No. 2002/0012071 A1, Jan. 31, 2002.

Adobe Systems, Inc., website, 2002, http://www.adobe.com/products/acrobat/cooltype.html.

Betrisey, C., et al., "Displaced Filtering for Patterned Displays," 2000, *Society for Information Display (SID) 00 Digest*, pp. 296-299.

Carvajal, D., "Big Publishers Looking Into Digital Books," Apr. 3, 2000, *The New York Times*, Business/Financial Desk.

Elliott, C., "Active Matrix Display Layout Optimization for Subpixel Image Rendering," Sep. 2000, Proceedings of the 1st International Display Manufacturing Conference, pp. 185-189.

Elliott, C., "New Pixel Layout for PenTile Matrix," Jan. 2002, Proceedings of the International Display Manufacturing Conference, pp. 115-117.

Elliott, C., "Reducing Pixel Count without Reducing Image Quality," Dec. 1999, *Information Display*, vol. 15, pp. 22-25.

Gibson Research Corporation, website, "Sub-Pixel Font Rendering Technology, How It Works," 2002, http://www.grc.com/ctwhat.html.

Martin, R., et al., "Detectability of Reduced Blue Pixel Count in Projection Displays," May 1993, *Society for Information Display (SID) 93 Digest*, pp. 606-609.

Microsoft Corporation, website, 2002, http://www.microsoft.com/reader/ppc/product/cleartype.html.

Microsoft Press Release, Nov. 15, 1998, Microsoft Research Announces Screen Display Breakthrough at COMDEX/Fall '98, PR Newswire.

Murch, M., "Visual Perception Basics," 1987, *SID*, Seminar 2, Tektronix, Inc., Beaverton, Oregon.

Okumura, H., et al., "A New Flicker-Reduction Drive Method for High-Resolution LCTVs," May 1991, *Society for Information Display (SID) International Symposium Digest of Technical Papers*, pp. 551-554.

Wandell, Brian A., Stanford University, "Fundamentals of Vision: Behavior, Neuroscience and Computation," Jun. 12, 1994, *Society for Information Display (SID) Short Course S-2*, Fairmont Hotel, San Jose, California.

U.S. Patent Application Publication No. US 2002/0015110 A1, Feb. 7, 2002, Brown Elliott.

Brown Elliott, C, "Co-Optimization of Color AMLCD Subpixel Architecture and Rendering Algorithms," SID 2002 Proceedings Paper, May 30, 2002 pp. 172-175.

Brown Elliott, C, "Development of the PenTile Matrix™ Color AMLCD Subpixel Architecture and Rendering Algorithms," SID 2003, Journal Article.

Brown Elliott, C, "New Pixel Layout for PenTile Matrix™ Architecture", IDMC 2002, pp. 115-117.

Brown Elliott, C, "Pentile Matirx™ Displays and Drivers" ADEAC Proceedings Paper, Portland OR., Oct. 2005.

Brown Elliott, C, "Reducing Pixel Count Without Reducing Image Quality", Information Display Dec. 1999, vol. 1, pp. 22-25.

E-Reader Devices and Software, Jan. 1, 2001, Syllabus, http://www.campus-technology.com/article.asp?id=419.

Felgenblatt, Ron, "Remarks on Microsoft ClearType™", http://www.geocities.com/SiliconValley/Ridge/6664/ClearType.html. Dec. 5, 1998, Dec. 7, 1998, Dec. 12, 1999, Dec. 26, 1999, Dec. 30, 1999 and Jun. 19, 2000, 30 pages.

Krantz, John et al., Color Matrix Display Image Quality: The Effects of Luminance . . . SID 90 Digest, pp. 29-32.

Messing, Dean et al., Improved Display Resolution of Subsampled Colour Images Using Subpixel Addressing, IEEE ICIP 2002, vol. 1, pp. 625-628.

Messing, Dean et al., Subpixel Rendering on Non-Striped Colour Matrix Displays, 2003 International Conf on Image Processing, Sep. 2003, Barcelona, Spain, 4 pages.

Poor, Alfred, "LCDs: The 800-pound Gorilla," Information Display, Sep. 2002, pp. 18-21.

Wandell, Brian A., Stanford University, "Fundamentals of Vision: Behavior . . . ," Jun. 12, 1994, Society for Information Display (SID) Short Course S-2, Fairmont Hotel, San Jose, California.

Werner, Ken, "OLEDS, OLEDS, Everywhere . . . ," Information Display, Sep. 2002, pp. 12-15.

USPTO, Non-Final Office Action, dated Mar. 9, 2004 in US Patent No. 6,903,754 (U.S. Appl. No. 09/916,232).

USPTO, Non-Final Office Action, dated May 6, 2004 in US Patent No. 6,903,754 (U.S. Appl. No. 09/916,232).

Clairvoyante Inc., Response to Non-Final Office Action, dated Sep. 3, 2004 in US Patent No. 6,903,754 (U.S. Appl. No. 09/916,232).

USPTO, Final Office Action, dated Jan. 6, 2005 in US Patent No. 6,903,754 (U.S. Appl. No. 09/916,232).

Clairvoyante Inc., Response to Final Office Action, dated Jan. 28, 2005 in US Patent No. 6,903,754 (U.S. Appl. No. 09/916,232).

USPTO, Non-Final Office Action, dated Feb. 7, 2005 in US Patent Publication No. 2003/0034992 (U.S. Appl. No. 10/051,612).

Clairvoyante Inc., Response to Non-Final Office, dated Jul. 7, 2005 in US Patent Publication No. 2003/0034992 (U.S. Appl. No. 10/051,612).

USPTO, Final Office Action dated, Aug. 31, 2005 in US Patent Publication No. 2003/0034992 (U.S. Appl. No. 10/051,612).

Clairvoyante Inc, Response to Final Office, dated Sep. 19, 2005 In US Patent Publication No. 2003/0034992 (U.S. Appl. No. 10/051,612).

USPTO, Non-Final Office Action dated, Dec. 15, 2005 In US Patent Publication No. 2003/0034992 (U.S. Appl. No. 10/051,612).

Clairvoyante Inc, Response to Non-Final Office, dated Feb. 8, 2006 In US Patent Publication No. 2003/0034992 (U.S. Appl. No. 10/051,612).

USPTO, Notice of Allowance, dated May 4, 2006 in US Patent Publication No. 2003/0034992 (U.S. Appl. No. 10/051,612).

USPTO, Non-Final Office Action, dated Jul. 28, 2005 in US Patent Publication No. 2003/0090581 (U.S. Appl. No. 10/278,393).

Clairvoyante Inc, Response to Non-Final Office Action, dated Jan. 30, 2006 In US Patent Publication No. 2003/0090581, (U.S. Appl. No. 10/278,393).

USPTO, Final Office Action, dated Apr. 18, 2006 In US Patent Publication No. 2003/0090581 (U.S. Appl. No. 10/278,393).

USPTO, Non-Final Office Action, dated May 4, 2005 in US Patent Publication No. 2003/0117423, (U.S. Appl. No. 10/278,328).

Clairvoyante Inc, Response to Non-Final Office Action, dated Nov. 3, 2005 in US Patent Publication No. 2003/0117423, (U.S. Appl. No. 10/278,328).

USPTO, Final Office Action, dated Feb. 17, 2006 in US Patent Publication No. 2003/0117423, (U.S. Appl. No. 10/278,328).

USPTO, Interview Summary, dated Mar. 17, 2006 In US Patent Publication No. 2003/0117423, (U.S. Appl. No. 10/278,328).
USPTO, Non-Final Office Action, dated Jun. 27, 2005 in US Patent Publication No. 2003/0103058, (U.S. Appl. No. 10/150,355).
Clairvoyante Inc, Response to Non-Final Office Action, dated Dec. 22, 2005 In US Patent Publication No. 2003/0103058, (U.S. Appl. No. 10/150,355).
USPTO, Final Office Action, dated Mar. 7, 2006 In US Patent Publication No. 2003/0103058, (U.S. Appl. No. 10/150,355).
Clairvoyante Inc, Response to Non-Final Office Action, dated Jul. 25, 2006 in US Patent Publication No. 2003/0103058, (U.S. Appl. No. 10/150,355).
USPTO, Non-Final Office Action, dated Mar. 24, 2005 In US Patent Publication No. 2003/0085906, (U.S. Appl. No. 10/215,843).
Clairvoyante Inc, Response to Non-Final Office Action, dated Sep. 26, 2005 In US Patent Publication No. 2003/0085906, (U.S. Appl. No. 10/215,843).
USPTO, Final Office Action, dated Jan. 25, 2006 in US Patent Publication No. 2003/0085906, (U.S. Appl. No. 10/215,843).
Clairvoyante Inc, Response to Non-Final Office Action, dated Jun. 26, 2006 in US Patent Publication No. 2003/0085906, (U.S. Appl. No. 10/215,843),
USPTO, Notice of Allowance, dated Jul 16, 2006 in US Patent Publication No. 2003/0085906, (U.S. Appl. No. 10/215,843).
USPTO, Non-Final Office Action, dated May 17, 2005 In US Patent Publication No. 2004/0051724, (U.S. Appl. No. 10/243,094).
Clairvoyante Inc, Response to Non-Final Office Action, dated Nov. 17, 2005 In US Patent Publication No. 2004/0051724, (U.S. Appl. No. 10/243,094).
USPTO, Final Office Action, dated Mar. 8, 2006 In US Patent Publication No. 2004/0051724, (U.S. Appl. No. 10/243,094).
USPTO, Non-Final Office Action, dated Nov. 16, 2004 in US Patent Publication No. 2003/0128179. (U.S. Appl. No. 10/278,352).
Clairvoyante Inc, Response to Non-Final Office Action, dated Apr. 15, 2005 In US Patent Publication No. 2003/0128179, (U.S. Appl. No. 10/278,352).
USPTO, Non-Final Office Action, dated Jul. 12, 2005 In US Patent Publication No. 2003/0128179, (U.S. Appl. No. 10/278,352).
Clairvoyante Inc, Response to Non-Final Office Action, dated Jan. 12. 2006 In US Patent Publication No. 2003/0128179, (U.S. Appl. No. 10/278,352).
USPTO, Non-Final Office Action, dated Oct. 26, 2004 In US Patent Publication No. 2004/0174380 (U.S. Appl. No. 10/379,765).
Clairvoyante Inc, Response to Non-Final Office Action, dated Jan. 24, 2005 In US Patent Publication No. 2004/0174380 (U.S. Appl. No. 10/379,765).
USPTO, Final Office Action, dated Jun. 2, 2005 in US Patent Publication No. 2004/0174380 (U.S. Appl. No. 10/379,765).
USPTO, Non-Final Office Action, dated Nov. 2, 2005 in US Patent Publication No. 2004/0174380 (U.S. Appl. No. 10/379,765).
Clairvoyante Inc, Response to Non-Final Office Action, dated Apr. 10, 2006 In US Patent Publication No. 2004/0174380 (U.S. Appl. No. 10/379,765).
USPTO, Notice of Allowance, dated Jul. 26, 2006 In US Patent Publication No. 2004/0174380 (U.S. Appl. No. 10/379,765).
Michiel A. Klompenhouwer, Gerard de Haan, Subpixel image scaling for color matrix displays, Journal of the Society for Information Display, vol. 11, Issue 1, Mar. 2003, pp. 99-108.
PCT International Search Report dated Jun. 3, 2002 for PCT/US02/12610 (U.S. Appl. No. 10/051,612).
PCT International Search Report dated Jul. 17, 2003 for PCT/US02/39859 (U.S. Appl. No. 10/278,393).
PCT International Search Report dated Jul. 30, 2003 for PCT/US02/39860 (U.S. Appl. No. 10/278,328).
PCT International Search Report dated Sep. 30, 2003 for PCT/US02/24994 (U.S. Appl. No. 10/215,843).
PCT International Search Report dated Jun. 14, 2004 for PCT/US03/028222 (U.S. Appl. No. 10/243,094).
PCT International Search Report dated Jun. 24, 2005 for PCT/US04/34773 (U.S. Appl. No. 10/696,026).
USPTO, Notice of Allowance, dated Feb. 7, 2005 in US Patent No. 6,903,754 (U.S. Appl. No. 09/916,232).
Clairvoyante Inc, Response to Non-Final Office Action, dated Sep. 18, 2006 in US Patent Publication No. 2003/0090581, (U.S. Appl. No. 10/278,383).
USPTO, Non-Final Office Action, dated Nov. 14, 2006 in US Patent Publication No. 2003/0090581, (U.S. Appl. No. 10/278,393).
Clairvoyante Inc, Response to Non-Final Office Action, dated May 14, 2007 in US Patent Publication No. 2003/0090581, (U.S. Appl. No. 10/278,393).
Clairvoyante Inc, Response to Final Office Action, dated Aug. 16, 2006 in US Patent Publication No. 2003/0117423, (U.S. Appl. No. 10/278,328).
USPTO, Non-Final Office Action, dated Nov. 15, 2006 in US Patent Publication No. 2003/0117423, (U.S. Appl. No. 10/278,328).
USPTO, Notice of Allowance, dated Nov. 30, 2006 in US Patent Publication No. 2003/0103058, (U.S. Appl. No. 10/150,355).
USPTO, Final Office Action, dated Sep. 18, 2006 in US Patent Publication No. 2003/0128179, (U.S. Appl. No. 10/278,352).
Clairvoyante Inc, Response to Final Office Action, dated Dec. 6, 2006 in US Patent Publication No. 2003/0128179, (U.S. Appl. No. 10/278,352).
USPTO, Non-Final Office Action dated Jan. 28, 2005 in US Patent Publication No. 2005/0088385 (U.S. Appl. No. 10/696,026).
Clairvoyante Inc, Response to Non-Final Office Action dated Jul. 27, 2005 in US Patent Publication No. 2005/0088385 (U.S. Appl. No. 10/696,026).
USPTO, Non-Final Office Action dated Sep. 16, 2005 in US Patent Publication No. 2005/0088385 (U.S. Appl. No. 10/696,026).
Clairvoyante Inc, Response to Non-Final Office Action dated Dec. 15, 2006 in US Patent Publication No. 2005/0088385 (U.S. Appl. No. 10/696,026).

* cited by examiner

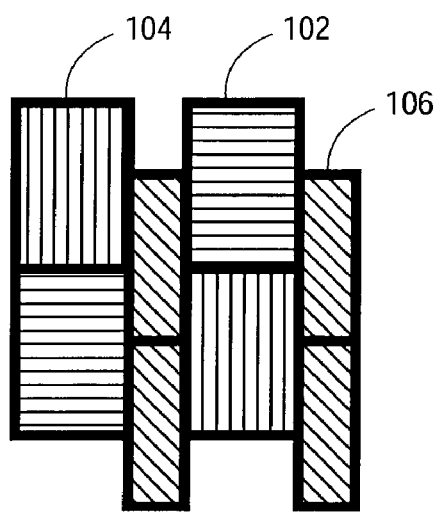 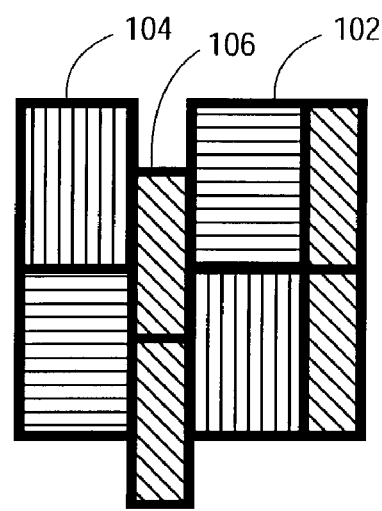
FIG. 8A  FIG. 8B

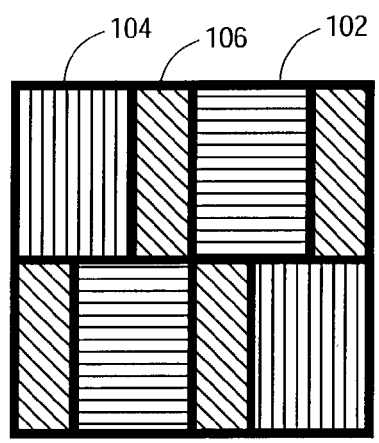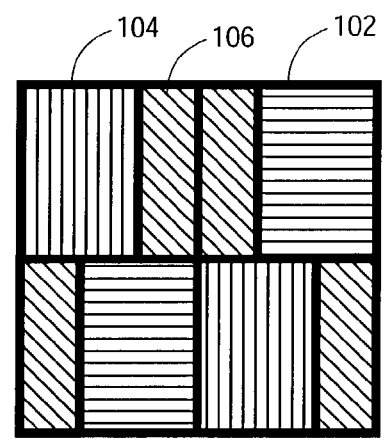
FIG. 9A     FIG. 9B

COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE

RELATED APPLICATIONS

This application claims priority to U.S. Provisional Application No. 60/346,738 ("the '738 provisional application"), entitled "ARRANGEMENT OF SUB-PIXELS WITH DOUBLE BLUE STRIPES," filed on Jan. 7, 2002, which is hereby incorporated herein by reference. This application is also a continuation-in-part of U.S. patent application Ser. No. 10/243,094, entitled "IMPROVED FOUR COLOR ARRANGEMENTS OF EMITTERS FOR SUB-PIXEL RENDERING," filed on Sep. 13, 2002, now abandoned and published as United States Patent Publication No. 2004/0051724 ("the '724 application"). which is hereby incorporated herein by reference and is commonly owned by the same assignee of this application.

This application is also related to United States Patent Publication No. 2003/0117423 ("the '423 application") [U.S. patent application Ser. No. 10/278,328,] entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed on Oct. 22, 2002; United States Patent Publication No. 2003/0090581 ("the '581 application") [U.S. patent application Ser. No. 10/278,393,] entitled "COLOR DISPLAY HAVING HORIZONTAL SUB-PIXEL ARRANGEMENTS AND LAYOUTS," filed on Oct. 22, 2002; and United States Patent Publication No. 2003/0128179 ("the '179 application") [U.S. patent application Ser. No. 10/278,352,] entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUBPIXELS," filed on Oct. 22, 2002. which are all hereby incorporated herein by reference and commonly owned by the same assignee of this application.

BACKGROUND

The present application relates to improvements to display layouts, and, more particularly, to improved color pixel arrangements, means of addressing used in displays, and to data format conversion methods for these displays.

Full color perception is produced in the eye by three-color receptor nerve cell types called cones. The three types are sensitive to different wavelengths of light: long, medium, and short ("red", "green", and "blue", respectively). The relative density of the three differs significantly from one another. There are slightly more red receptors than green receptors. There are very few blue receptors compared to red or green receptors.

The human vision system processes the information detected by the eye in several perceptual channels: luminance, chromanance, and motion. Motion is only important for flicker threshold to the imaging system designer. The luminance channel takes the input from only the red and green receptors. In other words, the luminance channel is "color blind". It processes the information in such a manner that the contrast of edges is enhanced. The chromanance channel does not have edge contrast enhancement. Since the luminance channel uses and enhances every red and green receptor, the resolution of the luminance channel is several times higher than the chromanance channels. Consequently, the blue receptor contribution to luminance perception is negligible. The luminance channel thus acts as a spatial frequency signal band pass filter. Its peak response is at 35 cycles per degree (cycles/°). It limits the response at 0 cycles/° and at 50 cycles/° in the horizontal and vertical axis. This means that the luminance channel can only tell the relative brightness between two areas within the field of view. It cannot tell the absolute brightness. Further, if any detail is finer than 50 cycles/°, it simply blends together. The limit in the horizontal axis is slightly higher than the vertical axis. The limit in the diagonal axes is somewhat lower.

The chromanance channel is further subdivided into two sub-channels, to allow us to see full color. These channels are quite different from the luminance channel, acting as low pass filters. One can always tell what color an object is, no matter how big it is in our field of view. The red/green chromanance sub-channel resolution limit is at 8 cycles/°, while the yellow/blue chromanance sub-channel resolution limit is at 4 cycles/°. Thus, the error introduced by lowering the red/green resolution or the yellow/blue resolution by one octave will be barely noticeable by the most perceptive viewer, if at all, as experiments at Xerox and NASA, Ames Research Center (see, e.g., R. Martin, J. Gille, J. Larimer, Detectability of Reduced Blue Pixel Count in Projection Displays, SID Digest 1993) have demonstrated.

The luminance channel determines image details by analyzing the spatial frequency Fourier transform components. From signal theory, any given signal can be represented as the summation of a series of sine waves of varying amplitude and frequency. The process of teasing out, mathematically, these sine-wave-components of a given signal is called a Fourier Transform. The human vision system responds to these sine-wave-components in the two-dimensional image signal.

Color perception is influenced by a process called "assimilation" or the Von Bezold color blending effect. This is what allows separate color pixels (also known as sub-pixels or emitters) of a display to be perceived as a mixed color. This blending effect happens over a given angular distance in the field of view. Because of the relatively scarce blue receptors, this blending happens over a greater angle for blue than for red or green. This distance is approximately 0.25° for blue, while for red or green it is approximately 0.12°. At a viewing distance of twelve inches, 0.25° subtends 50 mils (1,270μ) on a display. Thus, if the blue pixel pitch is less than half (625μ) of this blending pitch, the colors will blend without loss of picture quality. This blending effect is directly related to the chromanance sub-channel resolution limits described above. Below the resolution limit, one sees separate colors, above the resolution limit, one sees the combined color.

BRIEF DESCRIPTION OF THE DRAWINGS

The accompanying drawings, which are incorporated in, and constitute a part of this specification illustrate various implementations and embodiments disclosed herein.

FIGS. 8A and 8B show other embodiments of the octal subpixel arrangement with various vertical displacements of the subpixels.

FIGS. 9A and 9B show yet other embodiments of the octal subpixel arrangement of various displacements of the split majority subpixel within the subpixel grouping.

DETAILED DESCRIPTION

Reference will now be made in detail to implementations and embodiments of the invention, examples of which are illustrated in the accompanying drawings. Wherever possible, the same reference numbers will be used throughout the drawings to refer to the same or like parts.

Sub-Pixel Arrangements

Figure 1A:
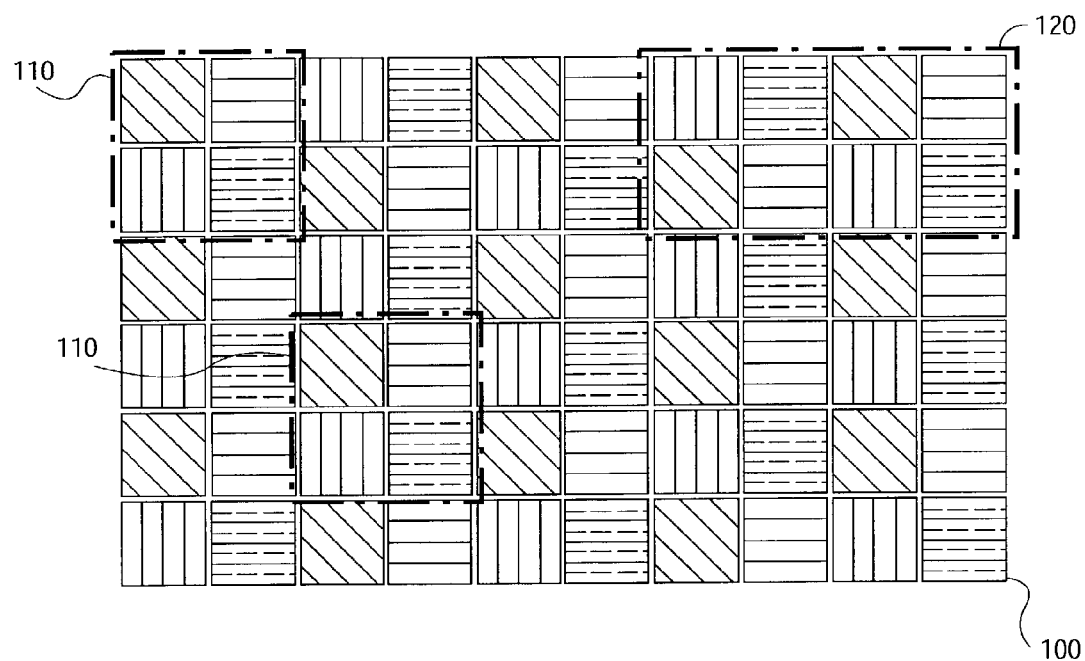
FIG. 1A shows an arrangement of four-color pixel elements in an array, in a single plane, for a display device, having a repeat cell consisting of eight sub-pixels.
Figure 1B:
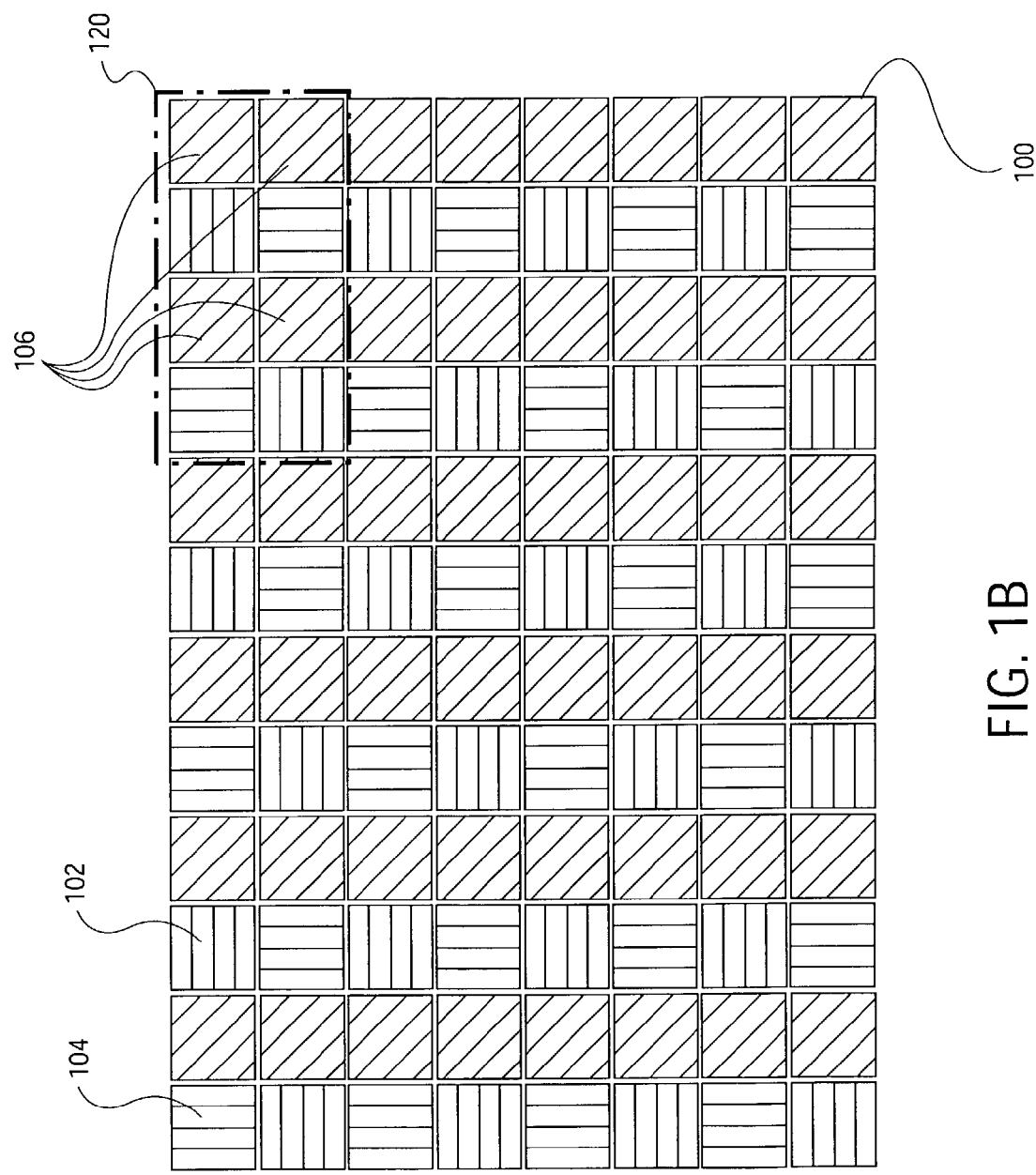
FIG. 1B shows an arrangement of three-color pixel elements in an array, in a single plane, for a display device, having a repeat cell of consisting of eight sub-pixels generated by selecting and defining four of the eight sub-pixels of FIG. 1A as the same color.

FIG. 1A shows an arrangement of sub-pixel emitters 100 having four color emitters in groupings 110 that is shifted down every other column group by one sub-pixel. This creates a larger rectilinearly repeating cell group 120 of eight sub-pixels. This layout was introduced in the '724 application Also disclosed in the '724 application is the practice of setting a plurality of the sub-pixels within the repeat cell to the same color point, an example of which is illustrated in FIG. 1B, wherein four of the emitters 106 in the eight emitter repeat cell group 120 are set to the same color. For example, these four emitters 106 may be set to be luminance adjusted (i.e. balanced) green in color. For example, the other sub-pixel emitters may be set to be red 104 and blue 102. The luminance balanced green 106 sub-pixels have twice the area, i.e., "real-estate," per color as the red 104 and blue 102 sub-pixels, but being balanced to have the same luminance as the red 104 sub-pixels, the total green energy is balanced to produce a pleasing white point when all sub-pixels are illuminated fully. The manner of balancing the luminance of the green color sub-pixel was previously disclosed in the '724 application.

Figure 1C:
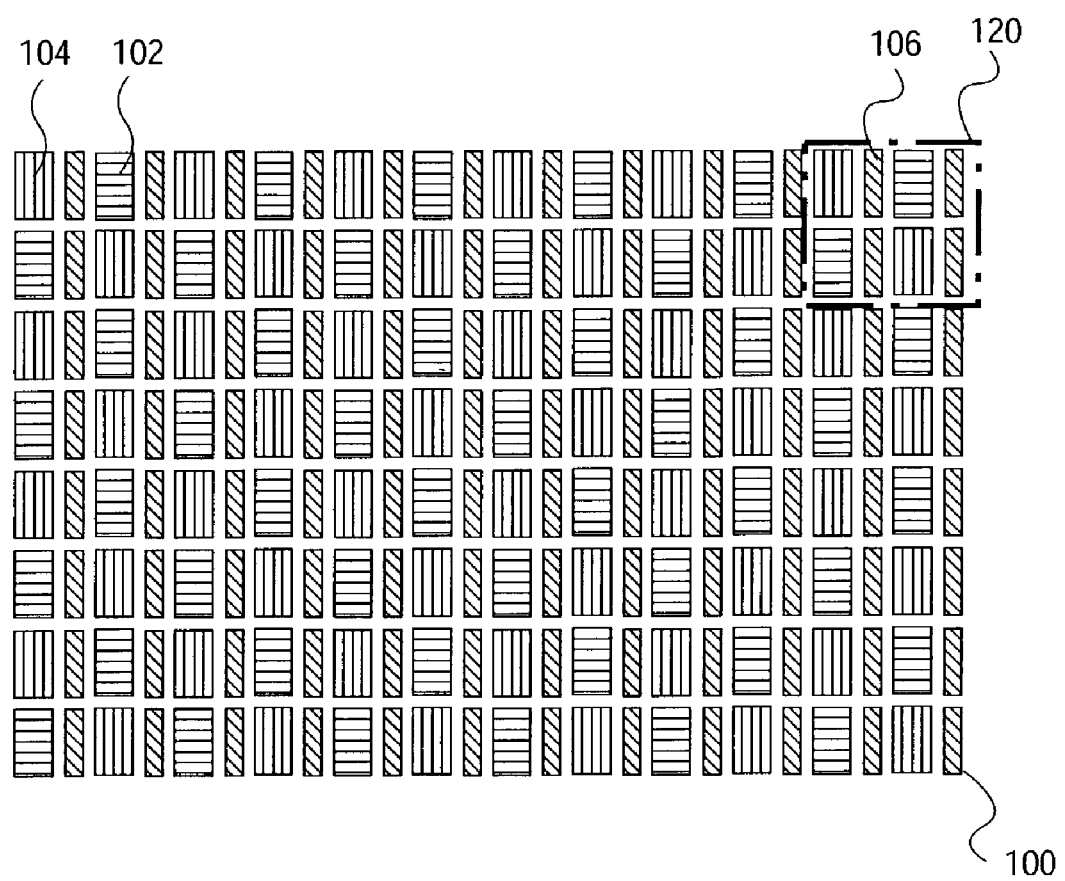
FIG. 1C shows an arrangement of three-color pixel elements in an array, in a single plane, for a display device, having a repeat cell of consisting of eight sub-pixels generated by selecting and defining four of the eight sub-pixels of FIG. 1A as the same color and reducing their widths.

In FIG. 1C, the four sub-pixel emitters 106 are reduced in size and aspect ratio compared to the other two sub-pixel emitters 104 and 102. The minority sub-pixels 104 and 102 may also be adjusted in aspect ratio. In this example, the relative size of sub-pixel 106 is adjusted to be one half of that of sub-pixels 104 or 102. As before, the colors may be assigned as desired. It should also be noted that although the repeat octal grouping is shown such that the majority color sub-pixels occupy the second and fourth columns, it also suffices that the majority sub-pixels could occupy the first and the third columns as well.

In another embodiment, the colors are assigned as red 104, blue 102, and non-luminance balanced green 106. Since there are twice as many green 106 as there are of the other two colors, red 104 and blue 102, the result is a pleasing white point when all sub-pixels are illuminated fully.

In this or another color assignment embodiment, the sub-pixel aspect ratios may be adjusted so that the display array 100 consists of square repeat cell groups 120. This will put the majority color sub-pixel emitter 106 on a square grid. It will also put the minority color sub-pixel emitters 102 and 104 on, or nearly on, an idealized "checkerboard". For an example of another color assignment embodiment, sub-pixels 106 could be assigned the color red and sub-pixels 104 could be assigned the color green in FIGS. 1B and 1C. Under this color assignment, the algorithms for sub-pixel rendering discussed below would work similarly.

Not only may the green or the red sub-pixels occupy the majority colored sub-pixels in octal octal grouping 120, but the blue sub-pixels may also occupy the majority sub-pixels. Such an arrangement was previously disclosed in '738 provisional application. Thus, all three colors—red, green, and blue—may occupy the majority sub-pixel position in this grouping. Additionally, while the colors—red, green and blue—have been used for the purposes of illustrating the present embodiments, it should be appreciated that another suitable choice of three colors—representing a suitable color gamut for a display—may also suffice for the purposes of the present invention.

As shown in FIGS. 1A, 1B and 1C, the subpixels appear to have a substantially rectangular appearance. It should be appreciated that other shapes to the subpixels are also possible and are contemplated within the scope of the present invention. For example, a multitude of other regular or irregular shapes for the subpixels are possible and are desirable if manufacturable. It suffices only that there is an octal grouping of colored subpixels in the fashion herein described that may be addressable for the purposes of subpixel rendering (SPR).

As subpixel shapes may vary under the scope of the present invention, so too may the exact positions of the subpixels be varied under the scope of the present invention. For example, FIGS. 8A and 8B depict a similar octal subpixel grouping wherein one or both of the majority stripes 106 are offset (relatively or otherwise) from the other subpixels 102 and 104. Other vertical offsets are also possible.

Other embodiments of the octal groupings are also possible. FIGS. 9A and 9B depict octal groupings wherein the majority subpixels 106 are interspersed within the checkerboard of subpixels 102 and 104. Other arrangements of majority subpixel placement within such a checkerboard are also possible and are contemplated within the scope of the present invention.

FIGS. 9A and 9B may have column electrodes that zig-zag across the display. Column driver savings should be one third when compared to the RGB stripe system with the same resolution and the number of subpixels are about two thirds of the number of subpixels when compared to the RGB stripe system.

Yet other embodiments of the present invention are possible. For example, the entire octal subpixel groupings may be rotated 90 degrees to reverse the roles of row and column driver connections to the grouping. Such a horizontal arrangement for subpixels is further disclosed in the co-pending application United States Patent Publication No. 2003/0090581 ("the '581 application") entitled "COLOR DISPLAY HAVING HORIZONTAL SUB-PIXEL ARRANGEMENTS AND LAYOUTS" and is incorporated by reference.

The alternating "checkerboard" of emitters is similar to the red and green "checkerboard" that was disclosed in co-pending and commonly assigned United States Patent Publication No. 2002/0015110 ("the '110 application") [U.S. patent application Ser. No. 09/916,232] entitled "ARRANGEMENT OF COLOR PIXELS FOR FULL COLOR IMAGING DEVICES WITH SIMPLIFIED ADDRESSING," filed on Jul. 25, 2001, using sub-pixel rendering such as that described in cop-ending United States Patent Publication No. 2003/0103058 ("the '058 application") [U.S. patent application Ser. No. 10/150,355] entitled "METHODS AND SYSTEMS FOR SUB-PIXEL RENDERING WITH GAMMA ADJUSTMENT," filed on May 17, 2002. These co-pending applications are hereby incorporated herein by reference. The methods described in the above co-pending applications may be modified for the embodiments disclosed herein.

Figure 2:
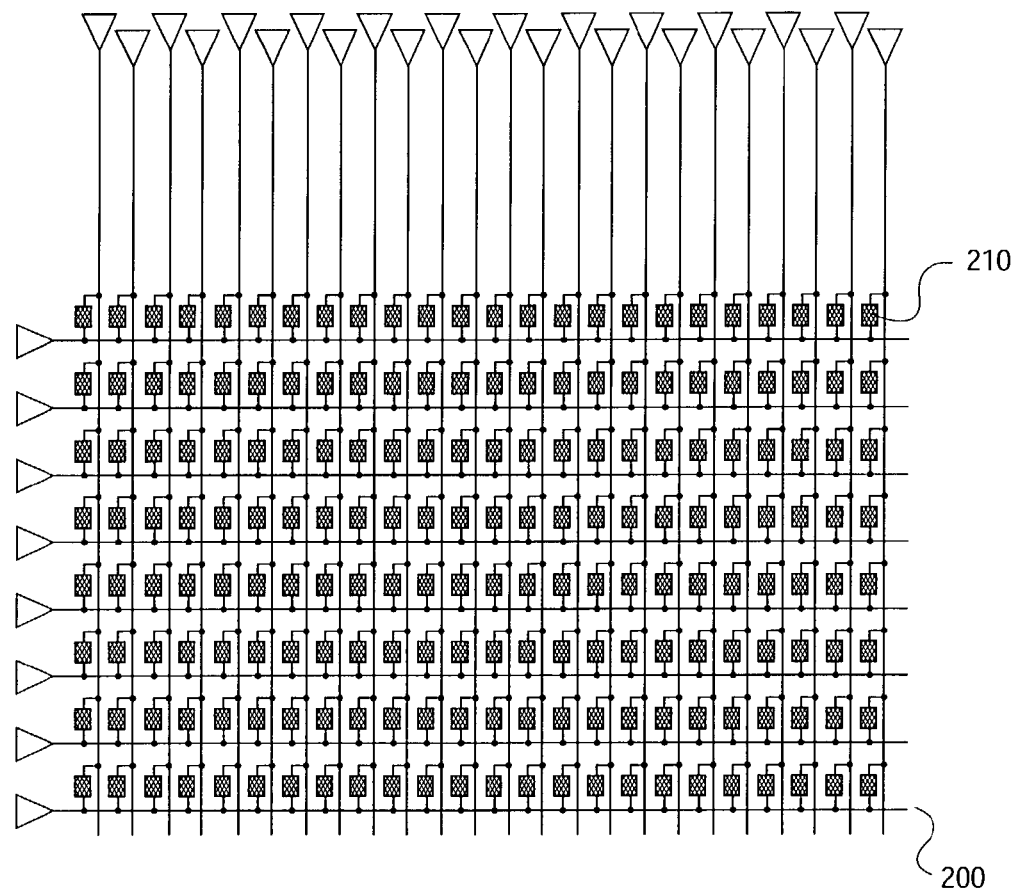
FIG. 2 shows a schematic of an electronic drive arrangement for the arrangement of sub-pixels shown in FIGS. 1A, 1B, and 1C.

FIG. 2 illustrates a schematic for a driver arrangement 200 for the arrangement of color emitter sub-pixels in FIGS. 1A, 1B, and 1C. For convenience, the example given has the same number of sub-pixels illustrated as FIG. 1C. This drive arrangement may be used for a number of display technologies, as the blocks 210 may represent one or several electrical components, which are not shown so as not to obscure the embodiments. In particular, they may represent the capacitive display cell element for passively addressed Liquid Crystal Display (LCD), or ElectroLuminescent (EL) Display. They may represent the gaseous discharge element in a Plasma Display Panel (PDP). They may represent the semiconductor diode element of a passively addressed Inorganic Light Emitting Diode or an Organic Light Emitting Diode Display. They may also represent the transistor, storage capacitor, and capacitive cell element of an Active Matrix Liquid Crystal Display (AMLCD). They may further represent the multi-transistor, storage capacitor, and light emitting element of an Active Matrix Organic Light Emitting Diode Display (AMOLED). The may also represent, in general, the color sub-pixel and its associated electronic elements found in other known or yet to be developed display technologies.

The drive timing and method may be any of those known in the art for N×M drive matrices as those shown. However, there may be modifications needed due to the specific color assignments, particularly any checkerboard across the panel or color alternations within a single column. For example, the technique known in the art as "Multi-Row Addressing" or "Multi-Line Addressing" for passive LCD may be modified such that groupings of rows are restricted to odd and even row combinations. This will reduce potential color crosstalk since, within a column with two alternating color sub-pixels, only one color will be addressed at a time.

Figure 3A:
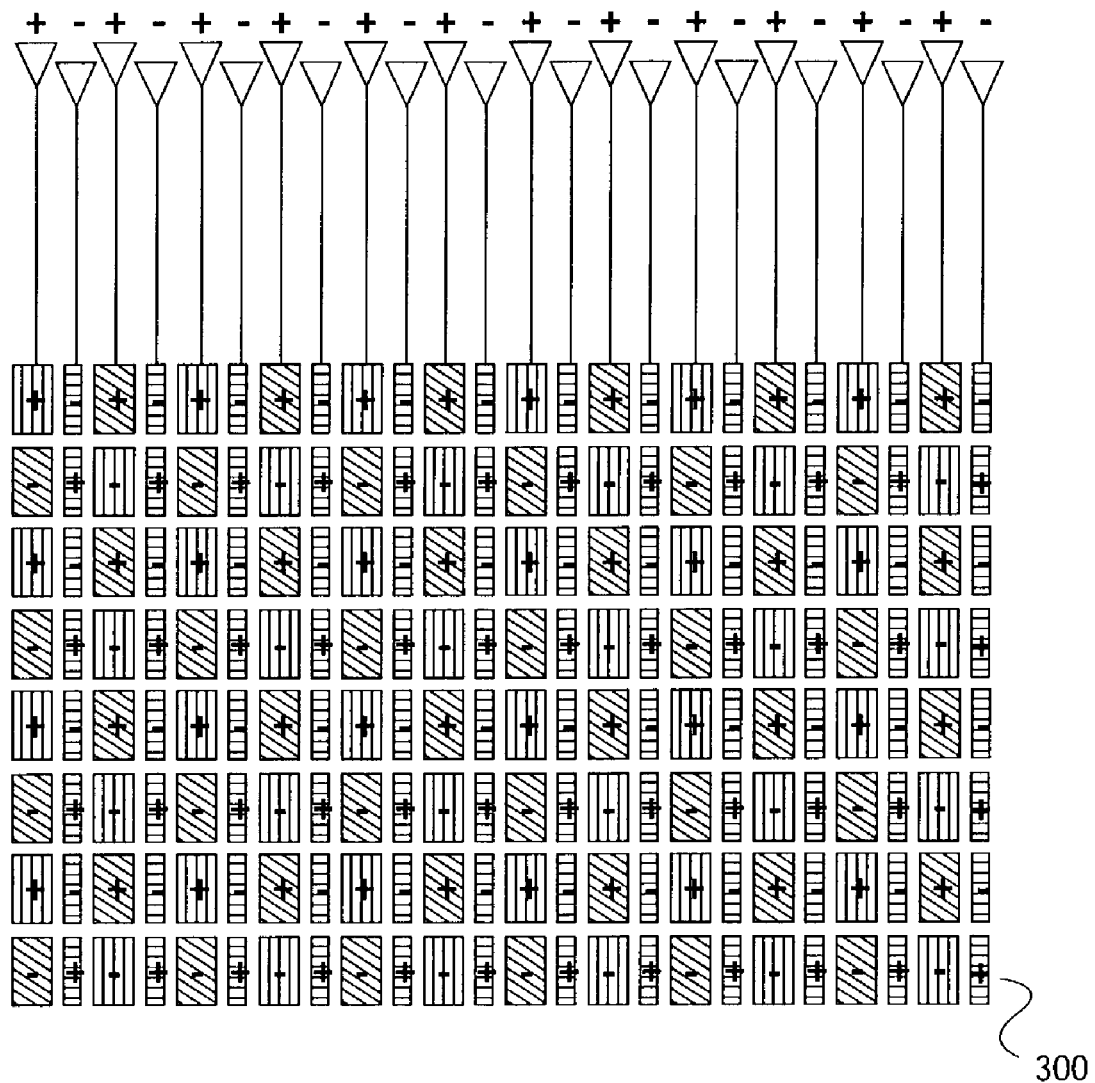
FIGS. 3A and 3B illustrate the relative polarities of active matrix dot inversion drive methods for a Liquid Crystal Display using the arrangement of color sub-pixels of FIG. 1C and the drive arrangement of FIG. 2.
Figure 3B:
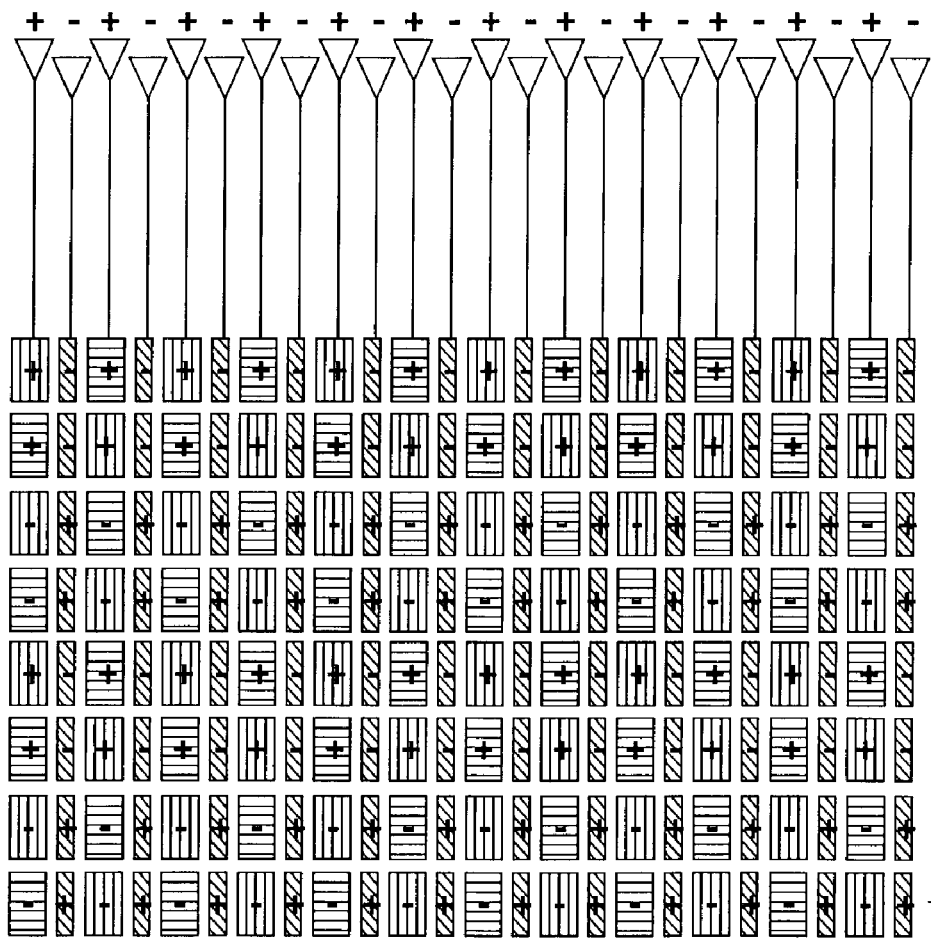

Inversion schemes, switching the electrical field polarity across the display cell to provide a time averaged zero net field and ion current across the cell, can be applied to the embodiments disclosed herein. FIGS. 3A and 3B show two "dot inversion" schemes 300 and 310, referred to as "1×1" and "2×1", respectively, on Active Matrix Liquid Crystal Displays, both of which will perform satisfactorily. The scheme shown on FIG. 3B may perform better when slight imbalances of light transmission occur between positive and negative polarities, especially when the eye is tracking the motion of displayed images moving across the screen. Each of the Figures shows the polarities during half of the display addressing fields. The polarities are reversed for the other half, alternating every field, resulting in a net zero current (zero DC bias), as is well known in the art.

Data Format Conversion

Figure 4A:
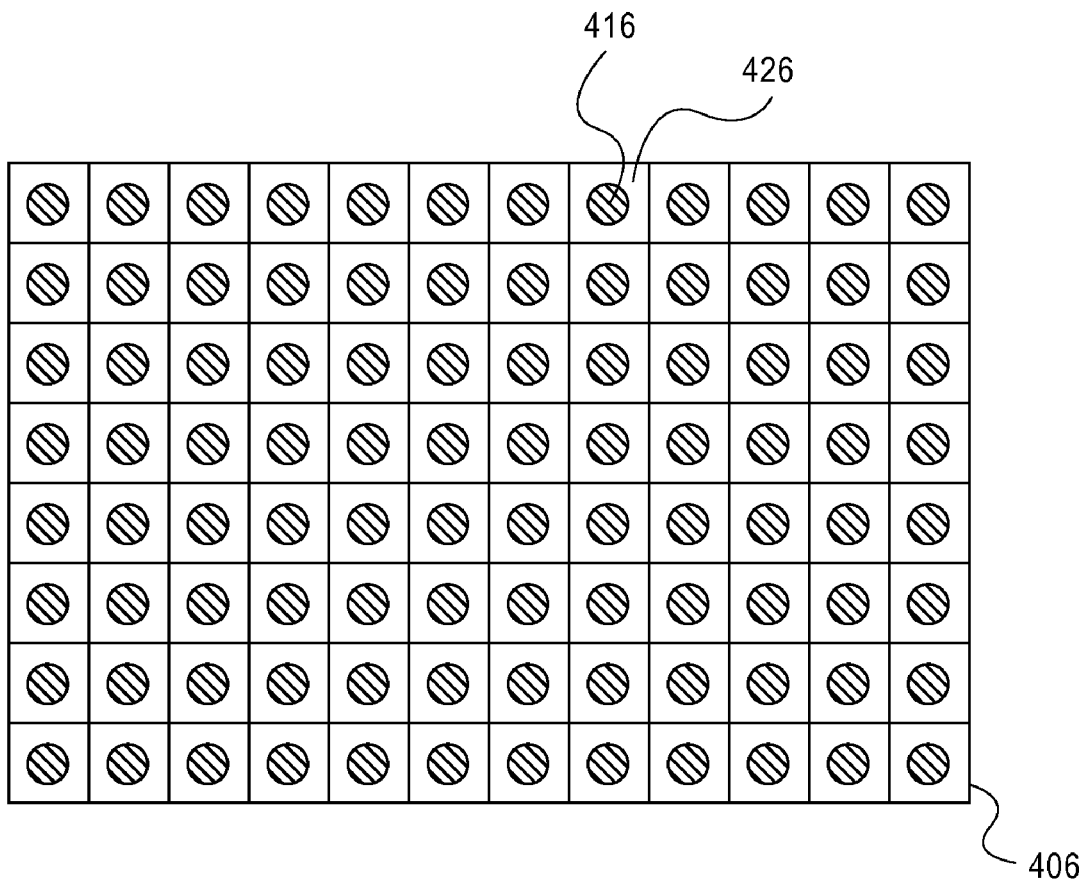
FIGS. 4A, 4B, 4C, and 4D illustrate a set of green, blue, and red resample areas separately and overlaid, respectively, for the arrangement of sub-pixels of FIG. 1C.
Figure 4B:
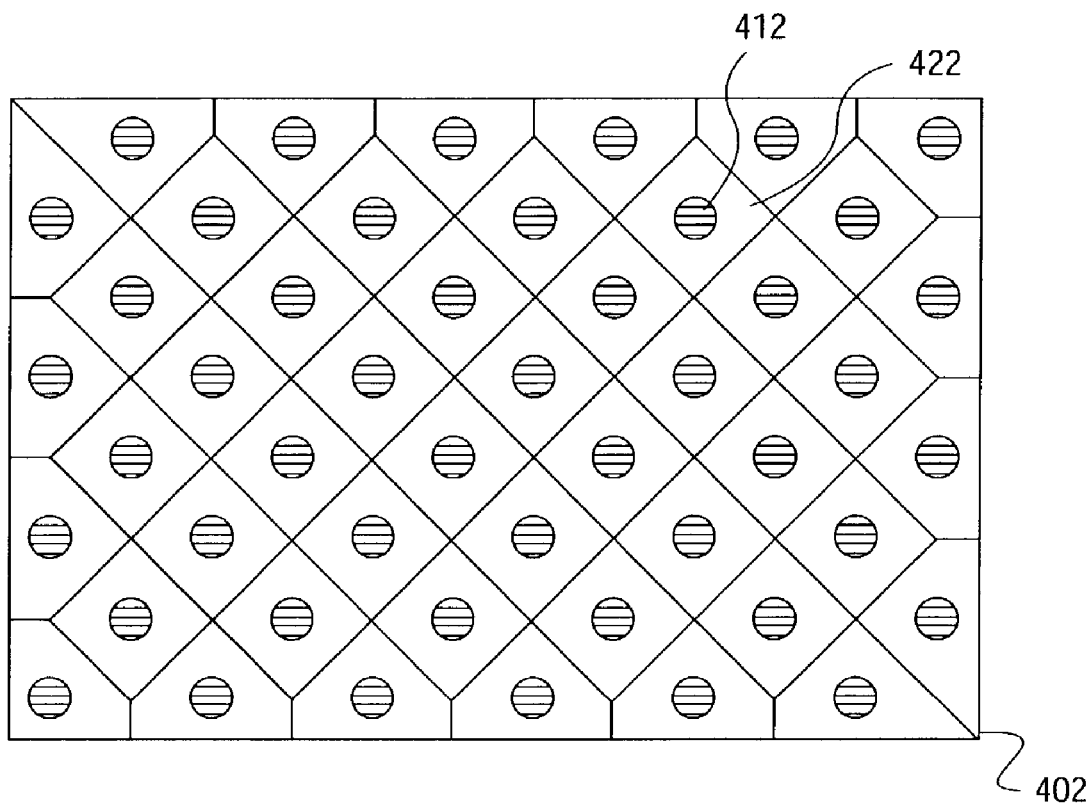
Figure 4C:
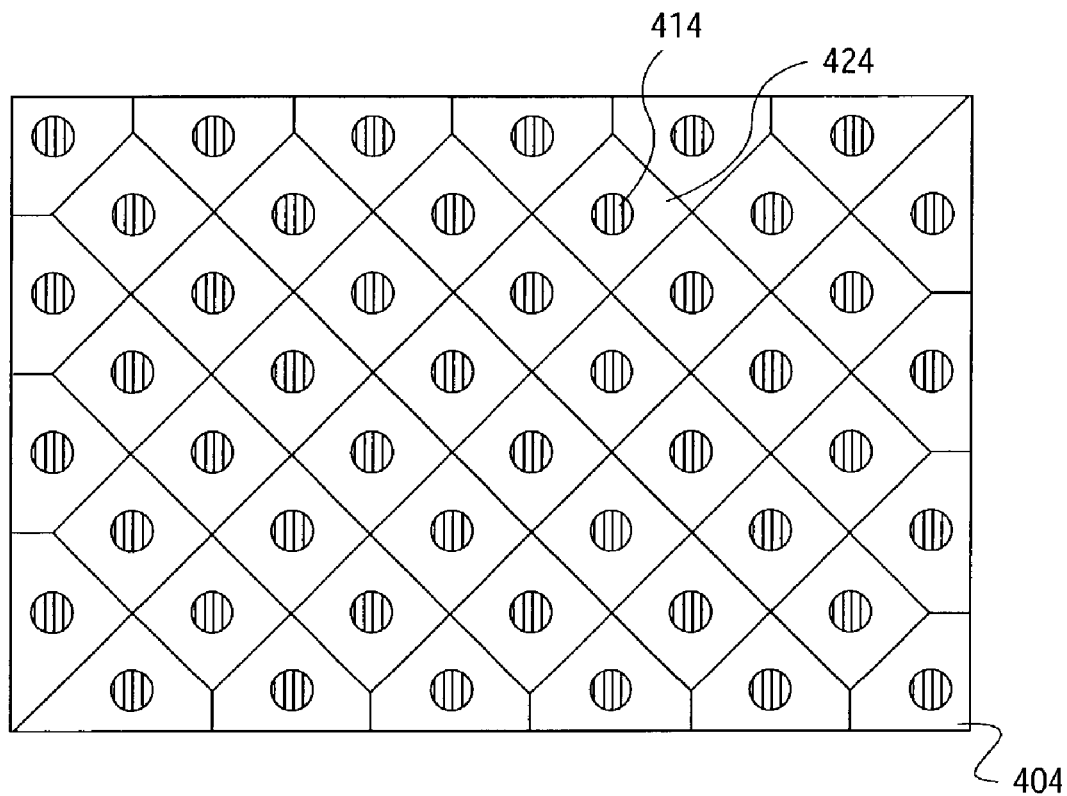

For one embodiment of data format conversion using area resampling techniques, FIGS. 4A, 4B, and 4C illustrate green 406, blue 402, and red 404 resample area arrays for the green, blue, and red color planes, respectively. Note that each color resample area array 406, 402, and 404 consists of resample areas 426, 422, and 424 and that each resample area has an associated resample point 416, 412, and 414, respectively, associated with it. The resample points 416, 412, and 414 match the relative positions of the green 106, blue 102, and red 104 sub-pixel locations respectively, within each color plane; but not necessarily their exact inter-color-plane-phase relationships. It should be appreciated that any number of phase relationships are also possible.

Figure 4D:
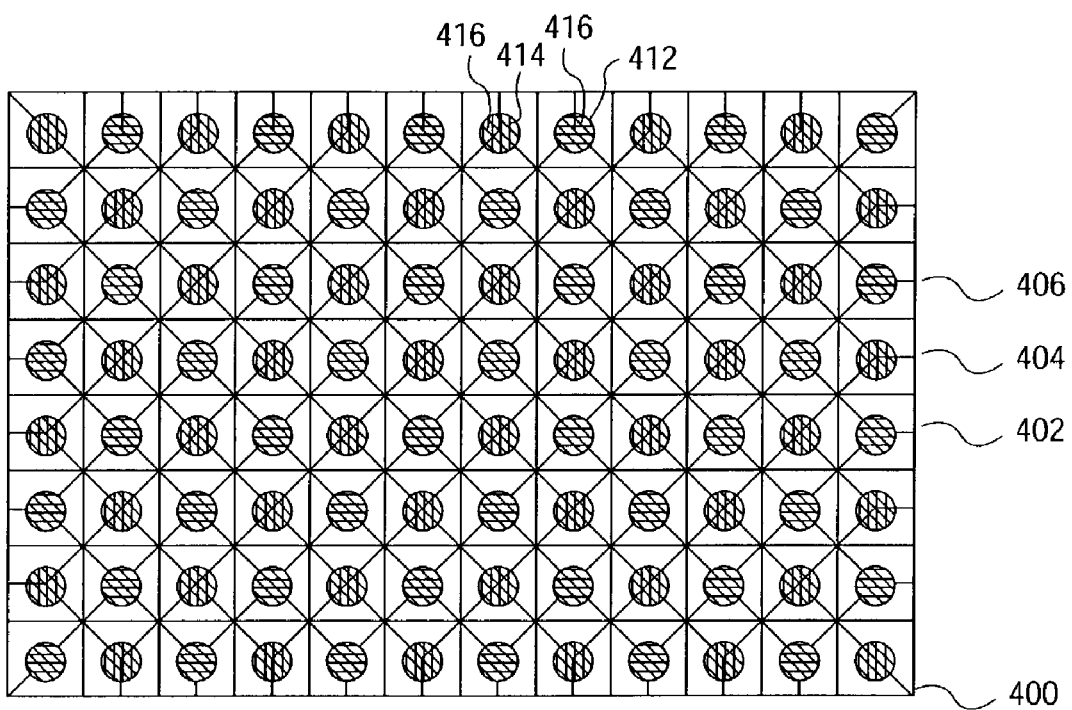

FIG. 4D illustrates one particular inter-color-plane-phase relationship 400. This relationship might be employed to convert the conventional fully converged square grid RGB format which is to be displayed "one-to-one" with the square green 106 sub-pixel grid of FIG. 1C. In this inter-color-plane-phase relationship 400, the green 406, blue 402, and red 404 resample area arrays are substantially positioned such that the red 414 and blue 412 resample points overlap the green 416 sample points. This treats the green sub-pixels 106 as though they lay on top of, or intimately associated with, the red 104 and blue 102 sub-pixel checkerboard.

Figure 5A:
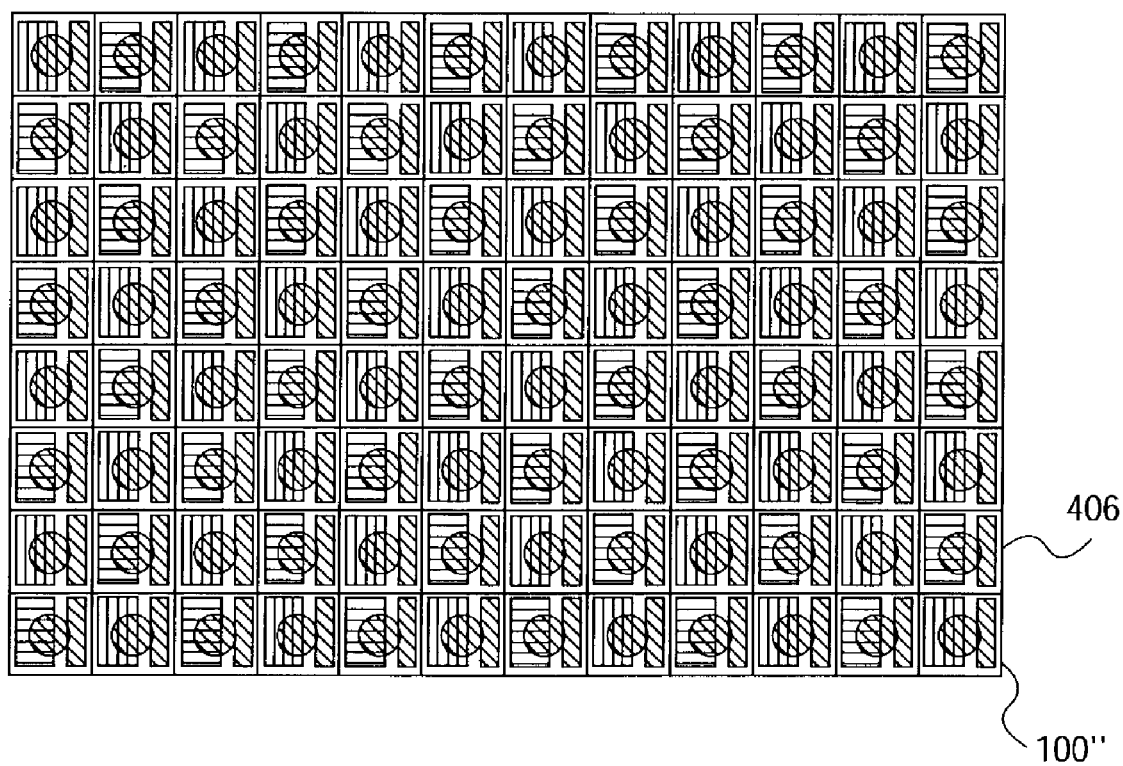
FIGS. 5A, 5B, 5C, and 5D illustrate the set of green, blue, and red resample areas of FIGS. 4A, 4B, 4C, and 4D respectively, overlaid on the arrangement of sub-pixels of FIG. 1C to show their relative positions.
Figure 5B:
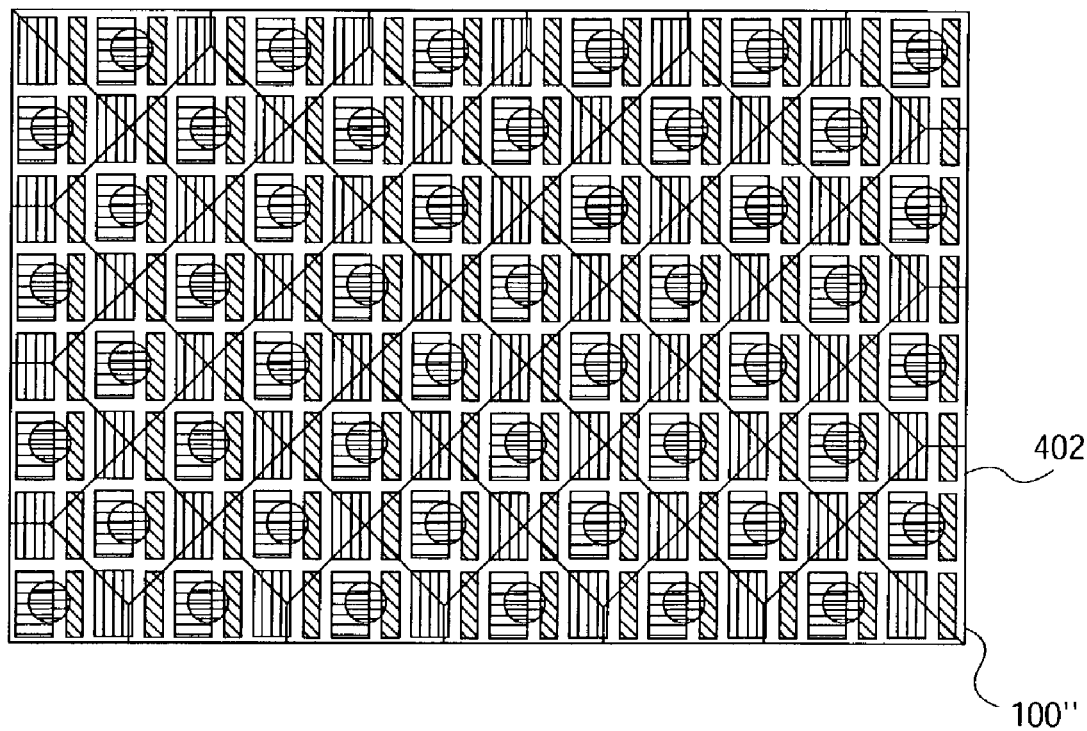
Figure 5C:
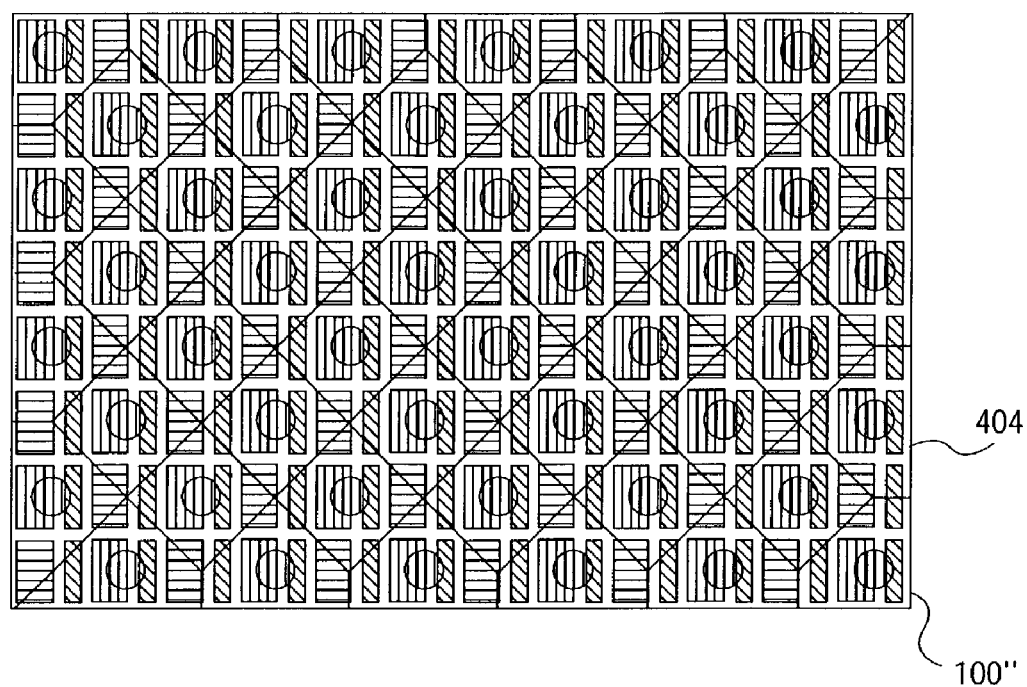
Figure 5D:
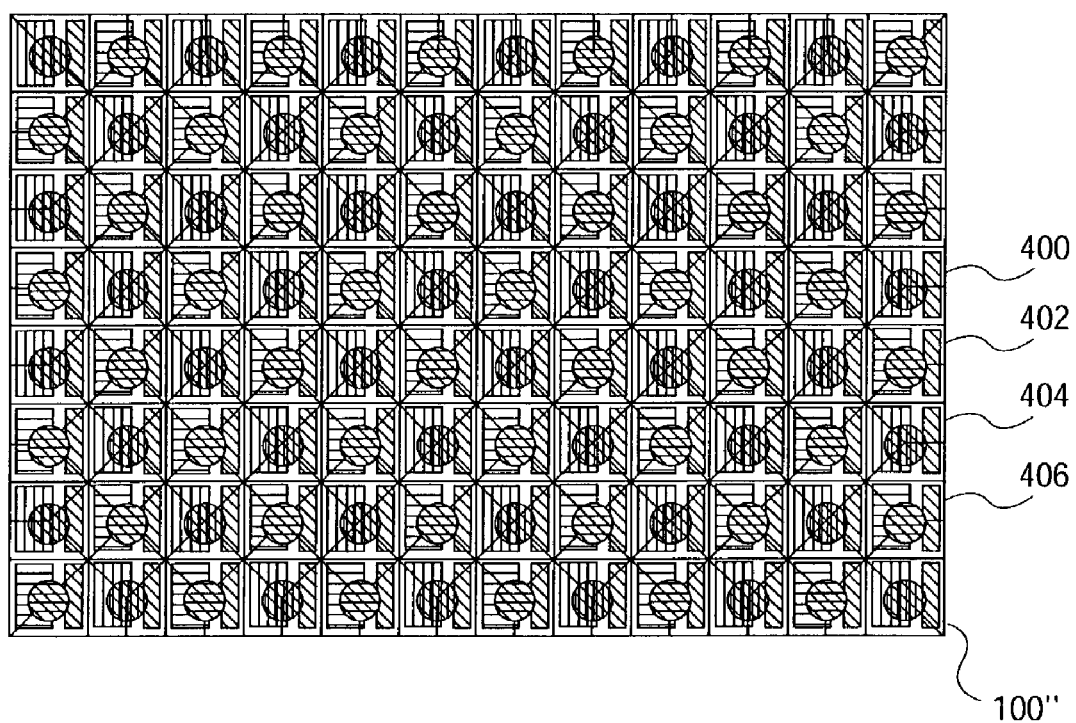

FIGS. 5A, 5B, and 5C illustrate the green 406, blue 402, and red 404 resample area arrays of FIGS. 4A, 4B, and 4C overlaid on the sub-pixel arrangement 100 of FIG. 1C, respectively, with the inter-color-plane-phase relationship 400 of FIG. 4D. FIG. 5D illustrates the inter-color-plane-phase relationship 400 of FIG. 4D overlaid on the sub-pixel arrangement 100 of FIG. 1C. These Figures are merely illustrative and only serve to provide an understanding of the relationship between the resample points, reconstruction points, resample areas, and sub-pixel locations for this embodiment.

The above referenced '058 patent application describes the method used to convert the incoming data format to that suitable for the display. In such a case, the method proceeds as follows: (1) determining implied sample areas for each data point of incoming three-color pixel data; (2) determining a resample area for each color sub-pixel in the display; (3) forming a set of coefficients for each resample area, the coefficients comprising fractions whose denominators are a function of the resample area and whose numerators are a function of an area of each implied sample area that may partially overlap the resample area; (4) multiplying the incoming pixel data for each implied sample area by the coefficient resulting in a product; and (5) adding each product to obtain luminance values for each resample area.

Examining a "one-to-one" format conversion case for the resample operation illustrated in FIG. 4D and 5D, the green plane conversion is a unity filter. The red and blue color planes use a 3×3 filter coefficient matrix, derived as explained in detail in the '058 application:

| 0     | 0.125 | 0     |
|-------|-------|-------|
| 0.125 | 0.5   | 0.125 |
| 0     | 0.125 | 0     |

Figure 5E:
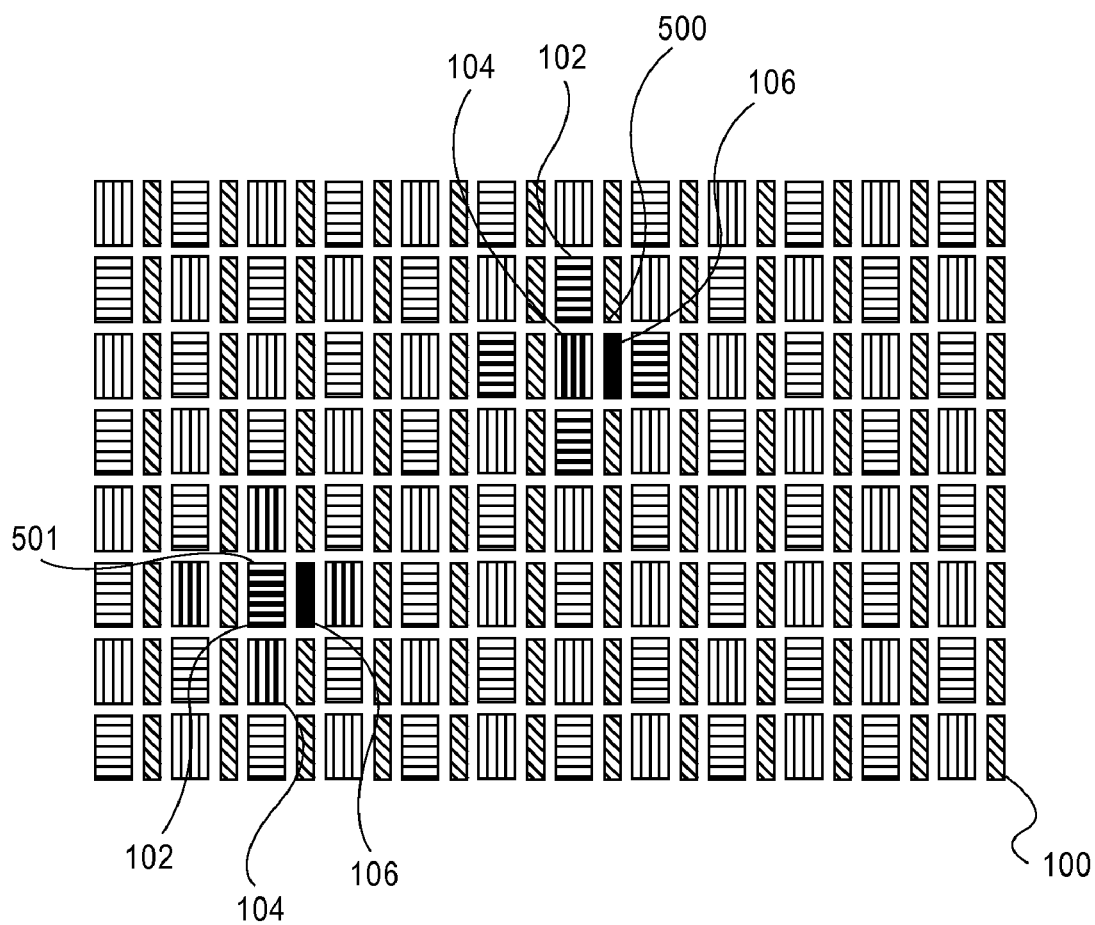
FIG. 5E illustrates two logical pixels displayed on the arrangement of FIG. 1C, resulting from the sub-pixel rendering operation of the resample areas of FIG. 4D.

FIG. 5E illustrates the results of turning on two full color incoming data pixels. The two pixels are converted to two clusters of output sub-pixels, called "logical pixels" 500 and 501, turned on at varying amplitudes. One of the logical pixels 500 is centered on or near a red sub-pixel 104. The green sub-pixel 106 is set at 100% illumination. The red sub-pixel 104 is set to 50% illumination, while the four surrounding blue sub-pixels 102 are set to 12.5% each. The result is a white dot visible to the human eye, centered between the red 104 and the green 106 sub-pixels. The other logical pixel 501, centered on or near blue sub-pixel 102, similarly has the green sub-pixel 106 set to 100% and the near by blue sub-pixel 102 set to 50% with the four surrounding red sub-pixels 104 set at 12.5% each.

Figure 6A:
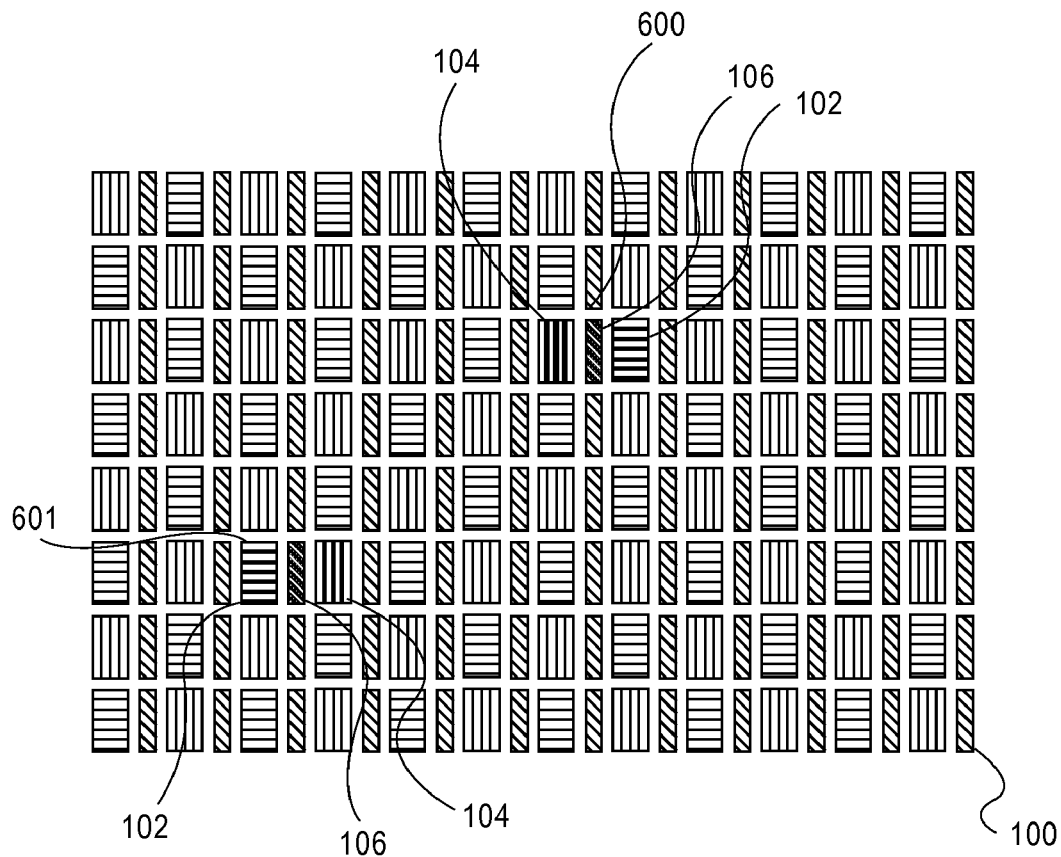
FIG. 6A illustrates two logical pixels displayed on the arrangement of FIG. 1C, resulting from the sub-pixel rendering operation of the resample areas of FIG. 6D.
Figure 6B:
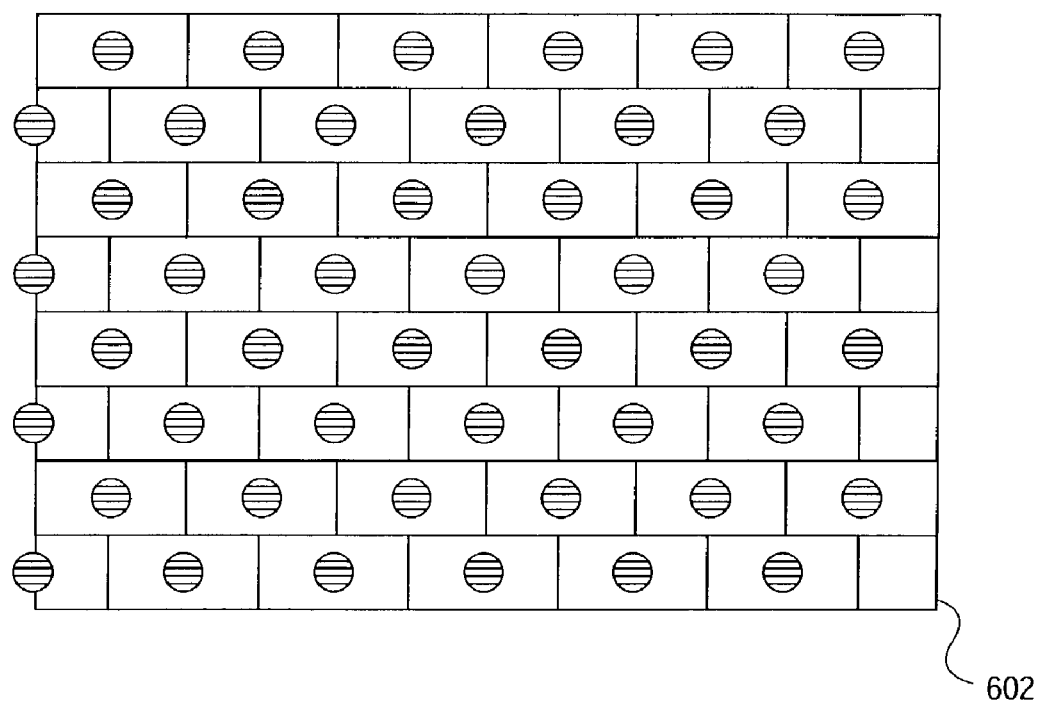
FIGS. 6B, 6C, and 6D illustrate a set of blue and red resample areas separately, and overlaid along with the green resample areas illustrated in FIG. 4A on arrangement of sub-pixels of FIG. 1C, respectively.
Figure 6C:
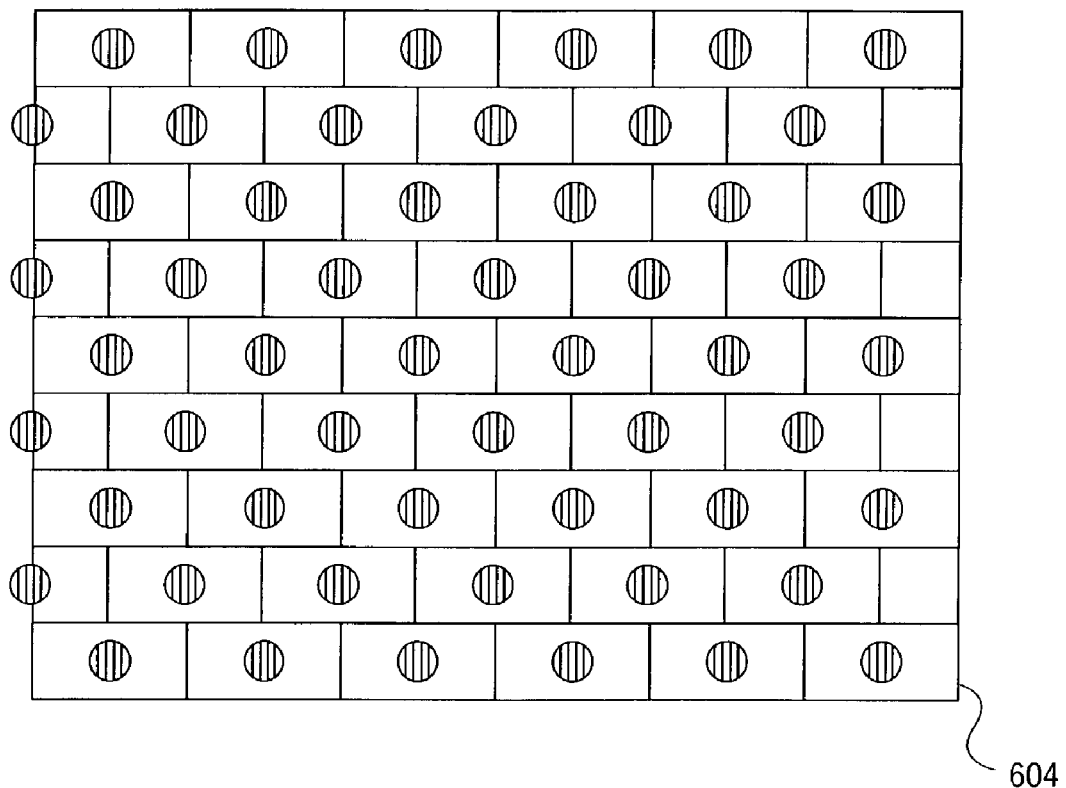
Figure 6D:
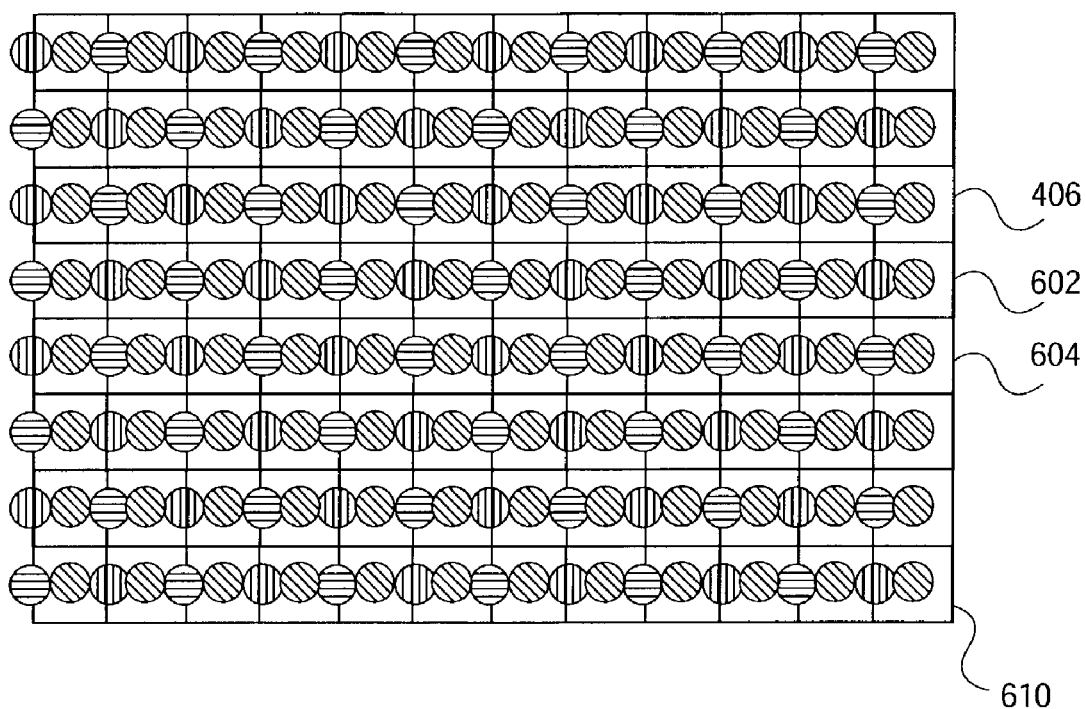

FIGS. 6B and 6C show an alternative blue color plane resample area array 602 and an alternative red color plane resample area array 604, respectively,—shown herein as box filters ([0.5 0.5])—to replace the blue and red resample area arrays 402 and 404 of FIGS. 4B and 4C, respectively. FIG. 6D illustrates an inter-color-plane-phase relationship 610 using the green resample area array 406 of FIG. 4A, and blue and red resample area arrays 602 and 604. FIG. 6A shows the logical pixels 600 and 601 that result from turning on two input data format pixels using the resample operation of the inter-color-plane-phase relationship 610 (FIG. 6D) from input data with a "one-to-one" pixel to green sub-pixel 106 mapping. These logical pixels 600 and 601 may be in the same relative positions as the two logical pixels 500 and 501 in FIG. 5E. Also, it may be possible to center the green box filter to match substantially an input pixel by adjusting the grid slightly.

Adaptive filtering techniques can also be implemented with the pixel arrangements disclosed herein, as further described below.

Again, the green resample uses a unitary filter. The red and blue color planes use a very simple 1×2 coefficient filter: [0.5 0.5]

An adaptive filter, similar to that disclosed in the co-pending and commonly assigned United States Patent Publication No. 2003/0085906 ("the '906 application") [U.S. patent application Ser. No. 10/215,843] entitled "METHODS AND SYSTEMS FOR SUB-PIXEL RENDERING WITH ADAPTIVE FILTERING," filed on Aug. 8, 2002, which is hereby incorporated herein by reference, can be adopted so as not to require a 3×3 sample of input data, which uses a minimum of two lines of memory. The test may be based on a smaller sample of input data, for example 1×3 or 1×2 matrices. The green data is sampled to test for vertical or diagonal lines and then the red and blue data adjacent to the green test point may be changed.

So, an adaptive filter test could be implemented as follows to test to see if a high contrast edge is detected: compare the green data (G) to a min value and a max value—if G<min or G>max, then a register value is set to 1, otherwise the register value is set to 0; compare the register values for three successive green data points to test masks to see if an edge is detected; if detected then take an appropriate action to the red and/or blue data—e.g. apply gamma or apply a new value or different filter coefficient.

The following table is illustrative of this embodiment:

| Data (for 3 successive points | 0.98 | 0.05 | 0.0  |
|-------------------------------|------|------|------|
| Low Test (G < 0.1)            | 0    | 1    | 1    |
| High Test (G > 0.9)           | 1    | 0    | 0    |
| Compare low and NOT high      | True | True | True |

For the example above, an edge has been detected and there is an array of options and/or actions to take at this point. For example, the gamma correction could be applied to the output of the box filter for red and/or blue; or a new fixed value representing the output required to balance color could be used; or use a new SPR filter.

The test for black lines, dots, edges and diagonal lines are similar in this case, since only three values are examined:

|    | Register Value |   |   | Binary no. |
|----|----------------|---|---|------------|
| 1. | 1              | 0 | 1 | 5          |
| 2. | 1              | 1 | 0 | 6          |
| 3. | 0              | 1 | 1 | 3          |

In the above table, the first row could represent a black pixel with white pixels on either side. The second row could represent an edge of a black line or dot. The third row could represent an edge of a black line in a different location. The binary numbers are used as an encoding for the test.

The test for white lines, dots, edges, and diagonal lines might be as follows:

|    | Register value |   |   | Binary no. |
|----|----------------|---|---|------------|
| 4. | 0              | 1 | 0 | 2          |
| 5. | 0              | 0 | 1 | 1          |
| 6. | 1              | 0 | 0 | 4          |

If the tests are true and the high and low tests are, for example, 240 and 16 (out of 255) respectively, then the output value for these edges using the box filter might be 128+/−4— or some other suitable value. The pattern matching is to the binary numbers shown adjacent to the register values. A simple replacement of 128 raised to an appropriate gamma power could be output to the display. For example, for gamma=2.2, the output value is approximately 186. Even though the input may vary, this is just an edge correction term so a fixed value can be used without noticeable error. Of course, for more precision, a gamma lookup table could likewise be used. It should be appreciated that a different value, but possibly similar, of correction could be used for white and black edges. It should likewise be appreciated that as a result of detecting an edge, the red and/or blue data could be acted on by a different set of filter coefficients—e.g. apply a [1 0] filter (i.e. unity filter) which would effectively turn off sub pixel rendering for that pixel value.

The above tests were primarily for a green test, followed by action on red and blue. Alternatively, the red and blue can be tested separately and actions taken as needed. If one desired to only apply the correction for black and white edges, than all three color data sets can be tested and the result ANDed together.

A further simplification could be made as follows. If only two pixels in a row are tested for edges, then the test above is further simplified. High and low thresholding may still be accomplished. If [0 1] or [1 0] is detected, then a new value could be applied—otherwise the original value could be used.

Yet another simplification could be accomplished as follows (illustrated for the red): subtract the red data value, $R_n$, from the red value immediately to the left, $R_{n-1}$; if the delta is greater than a predetermined number—say for example 240—then an edge is detected. If an edge is detected, one could substitute a new value, or apply gamma, output the value $R_n$ to the display, or apply new SPR filter coefficients; otherwise, if no edge is detected, output the results of the box filter to the display. As either $R_n$ or $R_{n-1}$ may be larger, the absolute value of the delta could be tested. The same simplification could occur for the blue; but the green does not need to be tested or adjusted, if green is the split pixel in the grouping. Alternatively, a different action could be taken for falling edges (i.e. $R_n-R_{n-1}<0$) and rising edges (i.e. $R_n-R_{n-1}>0$).

The results are logical pixels 600 and 601 that have only three sub-pixels each. For a white dot and using a box filter for red and blue data, the green sub-pixels 106 are set to 100% as before. The nearby red 104, as well as the nearby blue 102, could be all set to 50%. The resample operation of inter-color-plane-phase relationship 610 of FIG. 6D is very simple and inexpensive to implement, while still providing good image quality.

Both of the above data format conversion methods match the human eye by placing the center of logical pixels at the numerically superior green sub-pixels. The green sub-pixels are each seen as the same brightness as the red sub-pixel, even though half as wide. Each green sub-pixel 106 acts as though it were half the brightness of the associated logical pixel at every location, while the rest of the brightness is associated with the nearby red sub-pixel illuminated. Thus, the green serves to provide the bulk of the high resolution luminance modulation, while the red and blue provide lower resolution color modulation, matching the human eye.

Figure 7A:
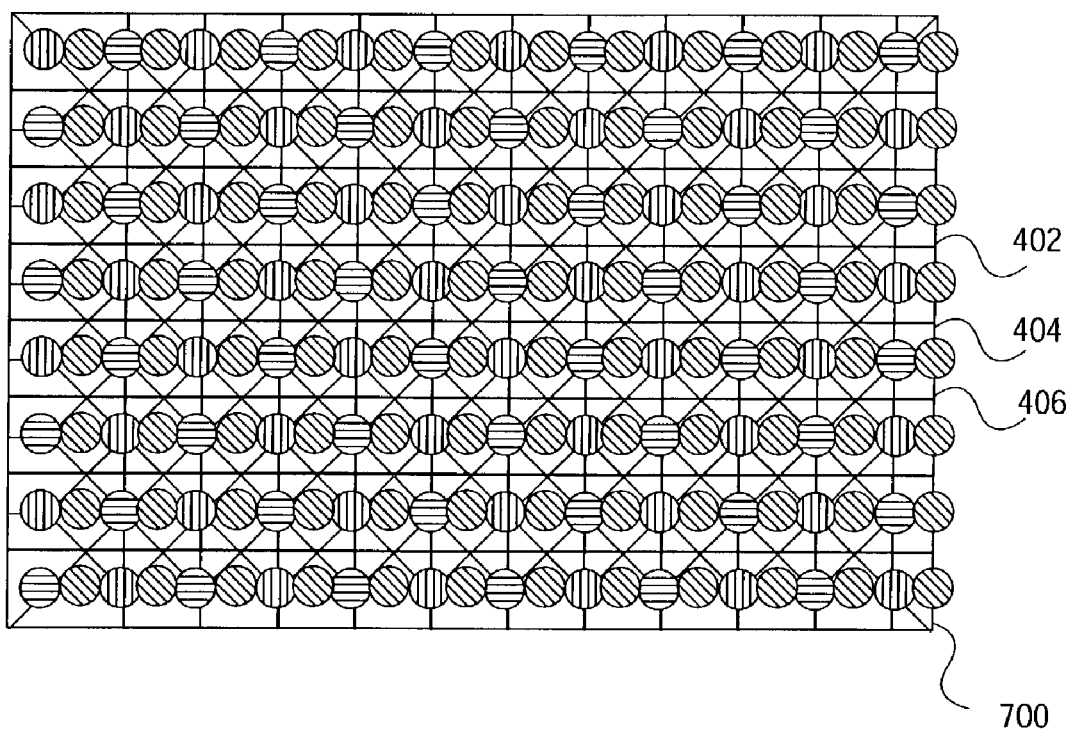
FIG. 7A illustrates the set of green, blue, and red resample areas of FIGS. 4A, 4B, and 4C respectively, overlaid show their relative positions.
Figure 7B:
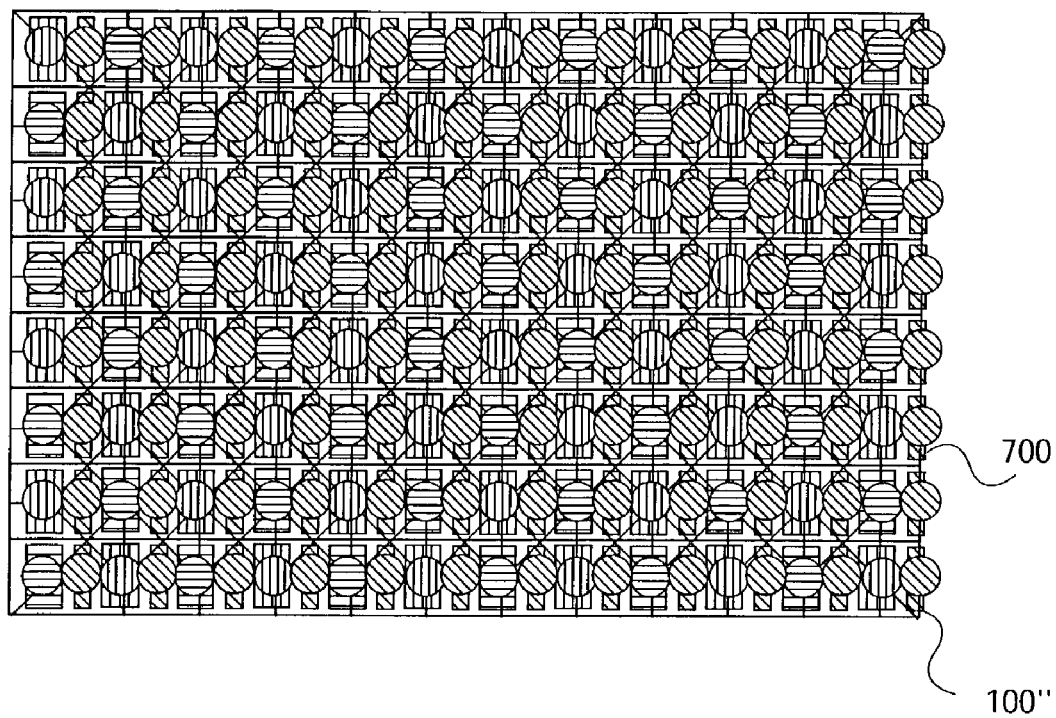
FIG. 7B illustrates the arrangement of resample areas of FIG. 7A overlaid on the arrangement of sub-pixels of FIG. 1C to show their relative positions.

FIG. 7A illustrates an alternative inter-color-plane-phase relationship 700 using the green, blue, and red resample area arrays 406, 402 and 404 of FIGS. 4A, 4B, and 4C. Note that inter-color-plane-phase relationship 700 has the same relative phase as color sub-pixel arrangement 100 of FIG. 1C as illustrated in FIG. 7B. Note that the relative phases of the resample points of inter-color-plane-phase relationship 700 is the same as that for inter-color-plane-phase relationship 610 of FIG. 6D. If this inter-color-plane-phase relationship 700 were used for the "one-to-one" data format conversion, the green would again be a unitary filter, while the red and blue would use 3×2 coefficient filter kernel:

| | |
|---|---|
| 0.0625 | 0.0625 |
| 0.375 | 0.375 |
| 0.0625 | 0.0625 |

Note that the two columns add up to 0.5 each, similar to the coefficients for the red and blue resample filter operation for the inter-color-plane-phase relationship 610 of FIG. 6D.

This inter-color-plane-phase relationship 700 shown in FIG. 7A is useful for scaling, both up and down, of conventional format data sets. The area resample method of calculation of the fitter coefficients and keeping track of the input and output data buffers was described in the referenced '058 application. However, according to another embodiment, while the red and blue color planes may be area resampled, it may be advantageous to calculate the filter coefficients for the square grid of green sub-pixels 106 using a novel implementation of a bi-cubic interpolation algorithm for scaling up data sets while converting them to be displayed on the arrangement of color sub-pixels 100 of FIG. 1C.

Figure 10:
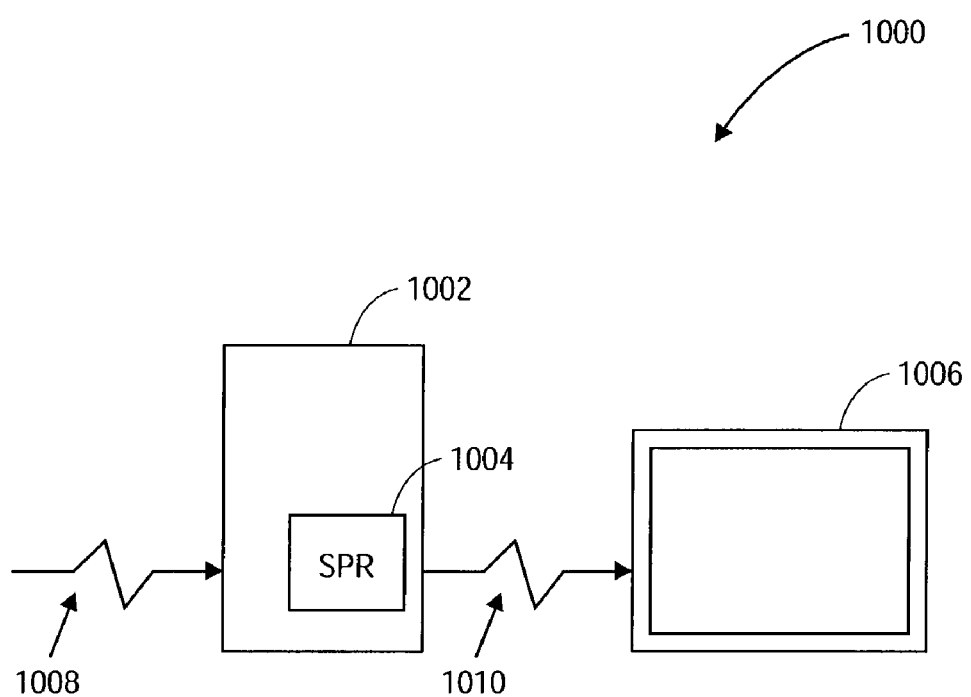
FIG. 10 depicts a system incorporating sub-pixel rendering techniques suitable to drive a panel made in accordance with the various embodiments described herein.

FIG. 10 depicts a system 1000 in which a display as constructed in accordance with the various embodiments disclosed herein is driven by a sub-pixel rendering technique 1004 which may be resident on a physical device 1002. An input image data stream 1008 may be input into the sub-pixel rendering technique 1004 and converted in the manner herein disclosed. An output image data stream 1010 is sent to the display device 1006 in order to drive the various sub-pixels to form an image thereupon. As discussed in several references incorporated herein, the sub-pixel rendering (SPR) technique 1004 may be implemented in either hardware and/or software or a combination thereof. For example, SPR techniques 1004 could be resident as logic (either hardware or software) on the display itself or it could reside on a graphics controller chip or board.

Figure 11A:
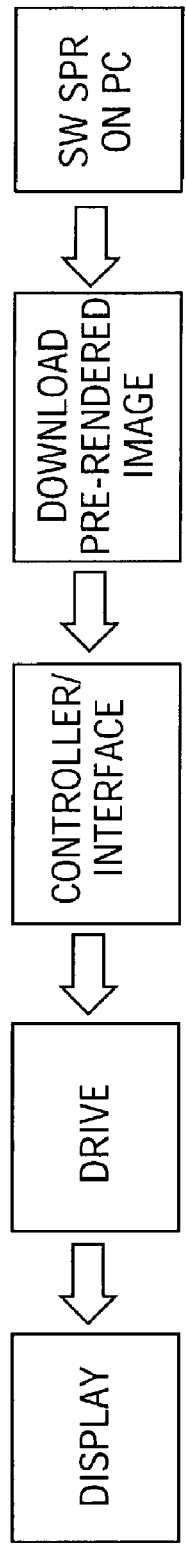
FIGS. 11A and 11B depict two particular embodiments of flowcharts to perform software and hardware sub-pixel rendering on a suitable display.
Figure 11B:
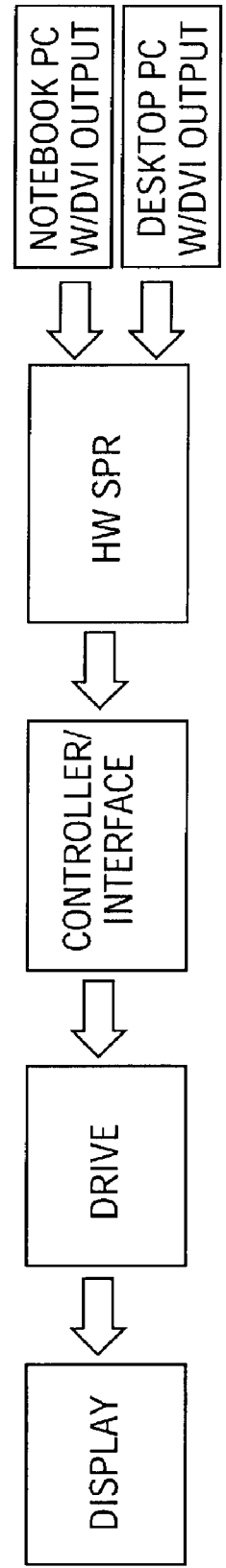

FIGS. 11A and 11B depict two particular flowchart embodiments disclosing sub-pixel rendering in software and hardware respectively. In FIG. 11A, SPR may be accomplished in advance on a PC or other processing system and/or means. From there, the pre-rendered images could be downloaded to a controller/interface and sent along to a drive running the display. In FIG. 11B, image data may be input from many different sources—for example, a notebook PC with DVI output or a desktop with DVI output—to a hardware module doing SPR. From there, the sub-pixel rendered data could be sent ultimately to the display via a controller/interface and a drive. Of course, other hardware and software implementations are possible and that FIGS. 11A and 11B merely describe two possible such implementations.

Figure 12:
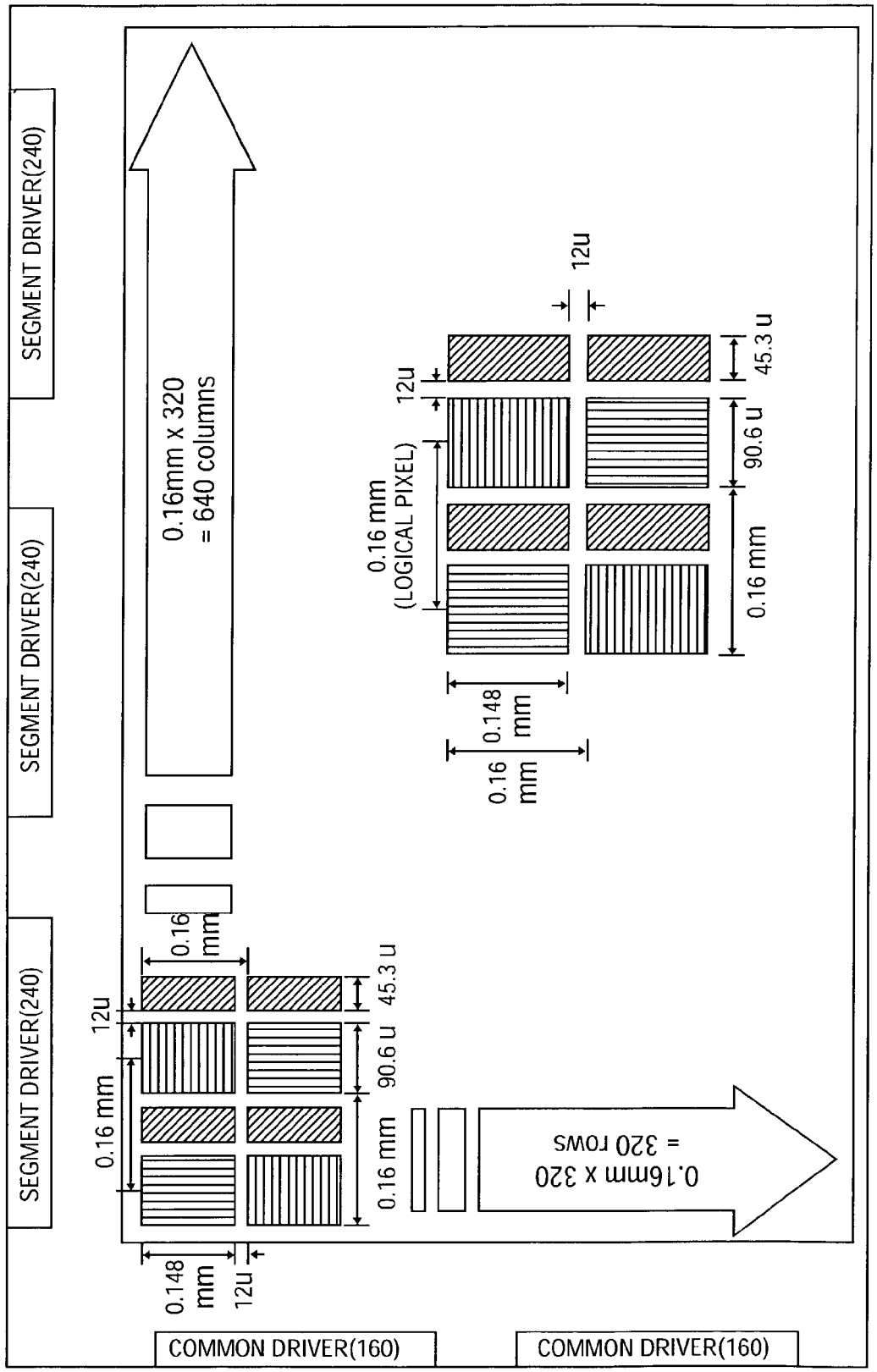
FIG. 12 is one particular embodiment of an implementation of a display made in accordance with several embodiments herein disclosed.

FIG. 12 shows one particular display embodiment for a 320×320 STN display using the sub-pixel repeat cell as disclosed herein. Although various sub-pixel dimensions are also disclosed in FIG. 12, it should be appreciated that other dimensions would also suffice and that FIG. 12 is merely offered for illustrative purposes for a single embodiment.

While the invention has been described with reference to exemplary embodiments, it will be understood that various changes may be made and equivalents may be substituted for elements thereof without departing from the scope of the invention. In addition, many modifications may be made to adapt a particular situation or material to the teachings without departing from the essential scope thereof. For example, some of the embodiments above may be implemented in other display technologies such as Organic Light Emitting Diode (OLED), ElectroLumenscent (EL), Electrophoretic, Active Matrix Liquid Crystal Display (AMLCD), Passive Matrix Liquid Crystal display (AMLCD), Incandescent, solid state Light Emitting Diode (LED), Plasma Display Panel (PDP), and Iridescent. Therefore, it is intended that the invention not be limited to the particular embodiment disclosed as the best mode contemplated for carrying out this invention, but that the invention will include all embodiments falling within the scope of the appended claims.

The invention claimed is:

1. A method of converting incoming three-color pixel data of a first format for rendering onto a display panel; said display panel comprising a plurality of a sub-pixel group; said sub-pixel group further comprising eight sub-pixels; wherein each said sub-pixel is one of a first color sub-pixel, a second color sub-pixel and a third color sub-pixel; wherein said sub-pixel group further comprises four sub-pixels of said first color, two sub-pixels of said second color and two sub-pixels of said third color; wherein further said sub-pixels of said second color and said sub-pixels of said third color form substantially a checkerboard pattern; the method comprising:
  determining implied sample areas for each data point of said incoming three-color pixel data;
  determining a resample area for each color sub-pixel on said display panel;
  forming a set of coefficients for each resample area, said coefficients comprising fractions whose denominators are a function of the resample area and whose numerators are a function of an area of each implied sample area that may partially overlap said resample area;
  multiplying the incoming pixel data for each implied sample area by a coefficient resulting in a product; and
  adding each product to obtain a luminance value for said color sub-pixel on said display panel represented by each resample area.

2. The method as recited in claim 1 wherein a plurality of resample areas for each color sub-pixel in the display forms a resample area array, and wherein the method further comprises:
  determining a phase relationship among the resample area arrays for each color sub-pixel.

3. The methods as recited in claim 2 wherein determining a phase relationship further comprises:
  positioning resample points for each said color resample areas such that the resample points for said second color and said third color substantially overlay the resample points for said first color.

4. The method as recited in claim 1 wherein said first color is green, and said second and third colors are red and blue respectively;
  wherein said set of coefficients for said resample areas for the green color comprises a unity filter; and
  wherein said set of coefficents for said resample areas for the red and blue colors are each a 3×3 filter coefficient matrix.

5. The method as recited in claim 1 wherein said unity filter is centered to substantially match an input pixel by adjusting said unity filter with respect to a sub-pixel grid.

6. The method as recited in claim 1 wherein said eight sub-pixels of said sub-pixel group are disposed in two rows of four sub-pixels, and wherein two sub-pixels of said first color, one sub-pixel of said second color and one sub-pixel of said third color are disposed in each of said two rows.

7. The method as recited in claim 1 wherein said eight sub-pixels of said sub-pixel group are disposed in two rows of four sub-pixels, and wherein said checkerboard pattern is formed by one of said sub-pixel of said second color following one of said sub-pixel of said third color in a first row, and one of said sub-pixel of said third color following one of said sub-pixel of said second color in a second row.

8. The method as recited in claim 1 wherein a combined area of said two sub-pixels of said first color is substantially equal to the area of one of said sub-pixel of said second color and said sub-pixel of said third color.

9. The method as recited in claim 1 wherein said eight sub-pixels of said sub-pixel group are disposed in two rows of four sub-pixels, and wherein said sub-pixels of said first color are disposed in columns in said sub-pixel group.

10. The method as recited in claim 9 wherein a first one of said columns of said sub-pixels of said first color is offset from a second one of said columns of said sub-pixels of said first color in said sub-pixel group.

11. The method of claim 1 wherein said display panel is an element of a display system utilizing one of a group of display technologies, said group of technologies comprising passively addressed Liquid Crystal Display (LCD), ElectroLuminescent (EL) Display, Plasma Display, passively addressed Inorganic Light Emitting Diode, Organic Light Emitting Diode Display, Active Matrix Liquid Crystal Display (AMLCD), and Active Matrix Organic Light Emitting Diode Display (AMOLED).

12. A system comprising:
  a display panel, said display panel comprising a plurality of a sub-pixel group; said sub-pixel group comprising eight sub-pixels specifying an output data format; said sub-pixel group further comprising four sub-pixels of a first color, two sub-pixels of a second color and two sub-pixels of a third color; said sub-pixels of said second color and said sub-pixels of said third color substantially forming a checkerboard pattern;
  means for receiving input image data specified in an input data format different from said output data format; and
  means for subpixel rendering said input image data specified in said input data format to said output data format of said plurality of sub-pixel groups on said display panel.

13. The system as recited in claim 12 wherein said means for subpixel rendering input image data further comprises:
  means for determining implied sample areas for each data point of said input image data;
  means for determining a resample area for each color sub-pixel in the display;
  means for forming a set of coefficients for each resample area, said coefficients comprising fractions whose denominators are a function of the resample area and whose numerators are a function of an area of each implied sample area that may partially overlap said resample area;
  means for multiplying the input image data for each implied sample area by a coefficient resulting in a product; and
  means for adding each product to obtain a luminance value for each resample area.

14. The system as recited in claim 13 wherein a plurality of resample areas for each color sub-pixel in the display forms a resample area array, and wherein the system further comprises:
  means for determining a phase relationship among the resample area arrays for each color sub-pixel.

15. The system as recited in claim 14 wherein means for determining a phase relationship further comprises:
  means for positioning resample points for each said color resample areas such that the resample points for said second color and said third color substantially overlay the resample points for said first color.

16. The system as recited in claim 13 wherein said first color is green, and said second and third colors are red and blue respectively;
  wherein said set of coefficients for said resample areas for the green color comprises a unity filter; and
  wherein said set of coefficents for said resample areas for the red and blue colors are each a 3×3 filter coefficient matrix.

17. The system as recited in claim 16 wherein said unity filter is centered to substantially match an input pixel by adjusting said filter with respect to a sub-pixel grid.

18. The system as recited in claim 12 wherein said eight sub-pixels of said sub-pixel group are disposed in two rows of four sub-pixels, and wherein two sub-pixels of said first color, one sub-pixel of said second color and one sub-pixel of said third color are disposed in each of said two rows.

19. The system as recited in claim 12 wherein said eight sub-pixels of said sub-pixel group are disposed in two rows of four sub-pixels, and wherein said checkerboard pattern is formed by one of said sub-pixel of said second color following one of said sub-pixel of said third color in a first row, and one of said sub-pixel of said third color following one of said sub-pixel of said second color in a second row.

20. The system as recited in claim 12 wherein a combined area of said two sub-pixels of said first color is substantially equal to the area of one of said sub-pixel of said second color and said sub-pixel of said third color.

21. The system as recited in claim 12 wherein said eight sub-pixels of said sub-pixel group are disposed in two rows of four sub-pixels, and wherein said sub-pixels of said first color are disposed in columns in said sub-pixel group.

22. The system as recited in claim 21 wherein a first one of said columns of said sub-pixels of said first color is offset from a second one of said columns of said sub-pixels of said first color in said sub-pixel group.

23. The system as recited in claim 12 wherein said system utilizes one of a group of display technologies, said group of technologies comprising passively addressed Liquid Crystal Display (LCD), ElectroLuminescent (EL) Display, Plasma Display, passively addressed Inorganic Light Emitting Diode, Organic Light Emitting Diode Display, Active Matrix Liquid Crystal Display (AMLCD), and Active Matrix Organic Light Emitting Diode Display (AMOLED).

24. A method of rendering input image data specified in a first format comprising first, second and third color data values onto a display panel substantially comprising a sub-pixel repeating group comprising eight sub-pixels of first, second and third colors disposed in two rows; said sub-pixel repeating group further comprising two sub-pixels of said first color, one sub-pixel of said second color and one sub-pixel of said third color disposed in each of said two rows; the method comprising:

determining a plurality of input sample areas for said input image data; each said input sample area representing one input image pixel indicating first, second and third color data values in said input image data;

determining a first color resample area array for said first color sub-pixels on the display panel; said first color resample area array comprising a plurality of first color resample areas each comprising a first color resample point such that one first color resample point represents one first color sub-pixel on the display panel;

for each first color resample point in said first color resample area array, assigning said first color data value of said one input image pixel represented by a corresponding implied sample area to a first luminance value for said first color sub-pixel represented by said first color resample point;

determining a second color resample area array and a third color resample area array for said respective second color and third color sub-pixels on the display panel; each of said second color and third color resample area arrays comprising a plurality of respective second color and third color resample areas each comprising respective second color and third color resample points such that one second color resample point represents one second color sub-pixel on the display panel and one third color resample point represents one third color sub-pixel on the display panel;

computing a set of coefficients for each of said second color resample areas and said third color resample areas, said coefficients comprising fractions whose denominators are a function of the respective resample area and whose numerators are a function of any partial area of each input sample area that may overlap said respective resample area when said respective resample area array overlays said input sample areas; and producing a second luminance value and a third luminance value for each respective second color sub-pixel and third color sub-pixel on the display panel by multiplying respective ones of said coefficients of a corresponding resample area by respective second color and third color data values of the input image data for each input sample area overlaid by said resample area, and adding the resulting products.

25. The method as recited in claim 24 wherein said first color is green, said second color is red and said third color is blue; said sub-pixel repeating group comprising two green sub-pixels, one blue sub-pixel and one red sub-pixel disposed in each of said two rows.

26. The method as recited in claim 25 wherein a combined area of said two green sub-pixels disposed in each row is substantially equal to the area of one of said blue sub-pixel and said red sub-pixel.

27. The method as recited in claim 24 wherein said first color is green, and wherein said sub-pixel repeating group comprises four green sub-pixels disposed in columns in said sub-pixel repeating group.

28. The method as recited in claim 24 wherein said sub-pixels of said second color and said sub-pixels of said third color form substantially a checkerboard pattern in said two rows such that a sub-pixel of said second color is followed by a sub-pixel of said third color in said first row, and a sub-pixel of said third color is followed by a sub-pixel of said second color in said second row.

29. The method as recited in claim 24 wherein each of said respective second color and third color resample areas overlaps at least two partial rows of input sample areas representing input image pixels in said input image data.

30. The method as recited in claim 24 wherein each of said respective second color and third color resample areas overlaps at most one partial row of input sample areas representing input image pixels in said input image data.

31. The method as recited in claim 24 wherein a plurality of said respective second color and third color resample areas has a diamond shape.

32. The method as recited in claim 24 further comprising determining a phase relationship among said first, second and third resample area arrays.

33. The method as recited in claim 32 wherein determining a phase relationship among said first, second and third resample area arrays comprises positioning said first, second and third color resample points for each respective first, second and third color resample area such that said first, second and third color resample points are substantially coincident.

34. The method as recited in claim 32 wherein determining a phase relationship among said first, second and third resample area arrays comprises positioning said first, second and third color resample points for each respective first, second and third color resample area such that none of said first, second and third color resample points are substantially coincident.

35. The method as recited in claim 24 wherein the step of computing a set of coefficients for each of said second color resample areas and said third color resample areas comprises computing a 3×3 filter coefficient matrix having the values

| 0 | 0.125 | 0 |
|---|---|---|
| 0.125 | 0.5 | 0.125 |
| 0 | 0.125 | 0. |

36. The method as recited in claim 24 wherein the step of computing a set of coefficients for each of said second color resample areas and said third color resample areas comprises computing a 3×2 filter coefficient matrix having the values

| 0.0625 | 0.0625 |
|---|---|
| 0.375 | 0.375 |
| 0.0625 | 0.0625. |

37. The method of claim 24 wherein said display panel is an element of a display system utilizing one of a group of display technologies, said group of technologies comprising passively addressed Liquid Crystal Display (LCD), ElectroLuminescent (EL) Display, Plasma Display, passively addressed Inorganic Light Emitting Diode, Organic Light Emitting Diode Display, Active Matrix Liquid Crystal Display (AM-LCD), and Active Matrix Organic Light Emitting Diode Display (AMOLED).

* * * * *